United States Patent
Tatsushiro et al.

(10) Patent No.: US 10,407,075 B2
(45) Date of Patent: Sep. 10, 2019

(54) VEHICLE CONTROL APPARATUS

(71) Applicant: Toyota Jidosha Kabushiki Kaisha, Toyota-shi (JP)

(72) Inventors: Hiromasa Tatsushiro, Toyota (JP); Hiromichi Kimura, Okazaki (JP); Tooru Matsubara, Toyota (JP); Kazuyuki Shiiba, Miyoshi (JP); Takeshi Kitahata, Toyota (JP); Shinichi Sasade, Toyota (JP); Nobufusa Kobayashi, Anjo (JP); Masato Yoshikawa, Toyota (JP); Takahiro Kimura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 24 days.

(21) Appl. No.: 15/841,623

(22) Filed: Dec. 14, 2017

(65) Prior Publication Data

US 2018/0170390 A1 Jun. 21, 2018

(30) Foreign Application Priority Data

Dec. 15, 2016 (JP) .................................. 2016-243616

(51) Int. Cl.
*B60W 30/19* (2012.01)
*B60W 20/15* (2016.01)
(Continued)

(52) U.S. Cl.
CPC ............. *B60W 30/19* (2013.01); *B60K 6/365* (2013.01); *B60K 6/445* (2013.01); *B60W 10/06* (2013.01);
(Continued)

(58) Field of Classification Search
USPC ........................................................ 701/51
See application file for complete search history.

(56) References Cited

U.S. PATENT DOCUMENTS

| | | | |
|---|---|---|---|
| 7,549,944 B2 * | 6/2009 | Tabata ..................... | B60K 6/40 477/5 |
| 7,722,497 B2 * | 5/2010 | Tabata .................. | B60K 6/445 477/3 |

(Continued)

FOREIGN PATENT DOCUMENTS

| | | |
|---|---|---|
| JP | 2004-203219 | 7/2004 |
| JP | 2006-256560 A | 9/2006 |

(Continued)

*Primary Examiner* — Dirk Wright
(74) *Attorney, Agent, or Firm* — Oblon, McClelland, Maier & Neustadt, L.L.P.

(57) ABSTRACT

A control apparatus (80; 122) for a vehicle provided with a motor/generator (MG2; MG) functioning as a drive power source, and a step-variable transmission (20; 110) which constitutes a part of a power transmitting path between the drive power source and drive wheels (28; 116) and which is placed in a selected one of a plurality of speed positions with engagement of a selected one or ones of a plurality of coupling devices (CB). The control apparatus includes: a torque control portion (86) configured to control an output torque (Ti) of the drive power source (MG2) during a shifting action of the step-variable transmission (40; 110) from one of the speed positions to another of the speed positions, on the basis of a required vehicle drive torque (Tidem) corresponding to an operation amount (θacc) of an accelerator pedal, such that a value representing a state of a rotary motion of an input rotary member (30) of the step-variable transmission coincides with a target value; and a torque limiting portion (92) configured to limit the required vehicle drive torque to a predetermined lower limit value (Tif) in the process of a shift-up action of the step-variable transmission which is performed by placement of the accelerator pedal in an operated position.

16 Claims, 8 Drawing Sheets

(51) Int. Cl.
*B60W 10/11* (2012.01)
*B60K 6/365* (2007.10)
*B60K 6/445* (2007.10)
*B60W 10/06* (2006.01)
*B60W 10/08* (2006.01)
*B60W 10/115* (2012.01)
*F16H 61/04* (2006.01)

(52) U.S. Cl.
CPC ............ *B60W 10/08* (2013.01); *B60W 10/11* (2013.01); *B60W 10/115* (2013.01); *B60W 20/15* (2016.01); *F16H 61/0437* (2013.01); *B60W 2540/10* (2013.01); *B60W 2710/083* (2013.01); *Y02T 10/6239* (2013.01); *Y02T 10/6286* (2013.01); *Y02T 10/7258* (2013.01)

(56) References Cited

U.S. PATENT DOCUMENTS

| | | | |
|---|---|---|---|
| 8,172,018 B2 * | 5/2012 | Suzuki | B60L 50/16 180/65.285 |
| 8,909,400 B2 * | 12/2014 | Sato | B60K 6/445 701/22 |
| 2014/0343775 A1 | 11/2014 | Yamamoto et al. | |

FOREIGN PATENT DOCUMENTS

| | | |
|---|---|---|
| JP | 2008-138691 | 6/2008 |
| JP | 2009/143388 A | 7/2009 |
| JP | 2014/052004 A | 3/2014 |
| JP | 2014-162359 | 9/2014 |
| JP | 2014-223888 | 12/2014 |
| JP | 2015-113932 | 6/2015 |

* cited by examiner

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

VEHICLE CONTROL APPARATUS

This application claims priority from Japanese Patent Application No. 2016-243616 filed on Dec. 15, 2016, the disclosure of which is herein incorporated by reference in its entirety.

FIELD OF THE INVENTION

The present invention relates to a control apparatus for a vehicle provided with a motor/generator and a step-variable transmission for transmitting a drive force of the motor/generator.

BACKGROUND OF THE INVENTION

There is well known a control apparatus for a vehicle provided with a motor/generator functioning as a drive power source, and a step-variable transmission which constitutes a part of a power transmitting path between the drive power source and drive wheels and which is placed in a selected one of a plurality of gear or speed positions with an engagement of a selected one or ones of a plurality of coupling devices. A hybrid vehicle disclosed in JP-2014-223888A is an example of this type of vehicle. This document discloses a control apparatus configured to control an output torque of the drive power source (a torque of a second motor/generator described in the document) during a shifting action of the step-variable transmission, on the basis of a required vehicle drive torque (required drive torque described in the document) corresponding to an operation amount of an accelerator pedal, such that an angular acceleration value (angular acceleration value of the second motor/generator described in the document) representing a state of a rotary motion of an input rotary member of the step-variable transmission coincides with a target value.

By the way, the vehicle provided with the motor/generator functioning as the drive power source can be braked with a regenerative braking force based on a regenerative torque (a negative torque) generated by the motor/generator, so that the required vehicle drive torque may have a negative value when the accelerator pedal is turned off, namely, returned back to its non-operated or fully released position. When the accelerator pedal is returned to its non-operated position in the process of a shift-up action of the step-variable transmission which is performed by placement of the accelerator pedal in an operated position, for instance, the output torque of the drive power source is reduced according to a decrease of the required vehicle drive torque, so that an input torque of the step-variable transmission is reduced. In this case, there is a risk of generation of a shifting shock of the step-variable transmission due to a loss of balance between the input torque of the step-variable transmission and a torque capacity of its coupling devices.

SUMMARY OF THE INVENTION

The present invention was made in view of the background art described above. It is therefore an object of the present invention to provide a control apparatus for such a vehicle described above, which permits prevention or reduction of the shifting shock of the step-variable transmission due to reduction of its input torque in the process of a shift-up action of the step-variable transmission which is performed by placement the accelerator pedal in an operated position.

The object indicated above is achieved according to the following modes of the present invention:

According to a first mode of the invention, there is provided a control apparatus for a vehicle provided with a motor/generator functioning as a drive power source, and a step-variable transmission which constitutes a part of a power transmitting path between the drive power source and vehicle drive wheels and which is placed in a selected one of a plurality of speed positions with engagement of a selected one or ones of a plurality of coupling devices, the control apparatus comprising: a torque control portion configured to control an output torque of the drive power source during a shifting action of the step-variable transmission from one of the plurality of speed positions to another of the plurality of speed positions, on the basis of a required vehicle drive torque corresponding to an operation amount of an accelerator pedal, such that a value representing a state of a rotary motion of an input rotary member of the step-variable transmission coincides with a target value; and a torque limiting portion configured to limit the required vehicle drive torque to a predetermined lower limit value in the process of a power-on shift-up action of the step-variable transmission which is performed by placement of the accelerator pedal in an operated position.

According to a second mode of the invention, the control apparatus according to the first mode of the invention further comprises a transmitted-torque setting portion configured to set a transmitted torque to be transmitted through one of the plurality of coupling devices which causes the shifting action to progress, on the basis of the required vehicle drive torque. The transmitted-torque setting portion sets the transmitted torque to be transmitted through the one of the plurality of coupling devices in the process of its power-on shift-up action, at a value set on the basis of the required vehicle drive torque at a moment of initiation of the power-on shift-up action, even if the required vehicle drive torque is lowered from the above-indicated value in the process of the power-on shift-up action.

According to a third mode of the invention, the control apparatus according to the first or second mode of the invention is configured such that the above-described torque limiting portion terminates the limitation of the required vehicle drive torque when a degree of progress (Rpro) of the power-on shift-up action has reached a predetermined value.

According to a fourth mode of the invention, the control apparatus according to any one of the first through third modes of the invention is configured such that the torque limiting portion is configured to set the predetermined lower limit of the required vehicle drive torque on the basis of a kind of the power-on shift-up action of the step-variable transmission or a rotating speed of the input rotary member of the step-variable transmission.

According to a fifth mode of the invention, the control apparatus according to any one of the first through fourth modes of the invention is configured to control the vehicle which is further provided with an engine also functioning as the drive power source, and a differential mechanism having a first rotary element to which the engine is operatively connected, a second rotary element to which a first motor/generator is operatively connected, and a third rotary element to which an intermediate power transmitting member is connected. The above-described motor/generator is a second motor/generator operatively connected to the intermediate power transmitting member. The control apparatus according to this fifth mode of the invention further comprises a transmission shifting control portion configured to implement the shifting action of the step-variable transmission to the above-indicated another of the plurality of speed positions, by controlling a releasing action of one of the plurality of coupling devices which has been placed in an engaged state before initiation of the shifting action, and an engaging action of another of the plurality of coupling devices which has been placed in a released state before initiation of the shifting action. The torque control portion is configured to control an output torque of the first motor/generator and an output torque of the second motor/generator during the shifting action of the step-variable transmission, on the basis of an output torque of the engine and a torque to be transmitted through one of the above-described one and another of the plurality of coupling devices which causes the shifting action to progress, such that an angular acceleration value of the second motor/generator and an angular acceleration value of the engine coincide with respective predetermined target values.

According to the first mode of the invention, the required vehicle drive torque corresponding to the operation amount of the accelerator pedal is limited to the predetermined lower limit value, namely, is not lowered below the lower limit value, in the process of the power-on shift-up action. Therefore, the amount of reduction of the output torque of the drive power source to be controlled on the basis of the required vehicle drive torque and the amount of reduction of the input torque of the step-variable transmission are reduced even if the accelerator pedal is returned to the non-operated position in the process of the power-on shift-up action. Thus, the control apparatus according to the first mode of this invention is configured to reduce a risk of loss of the balance between the input torque of the step-variable transmission and the torque capacity of the relevant coupling device in the process of the power-on shift-up action. Accordingly, it is possible to prevent or reduce a shifting shock of the step-variable transmission due to reduction of the input torque of the step-variable transmission during its power-on shift-up action.

According to the second mode of the invention, the transmitted torque in the process of the power-on shift-up action of the selected coupling device is set at the value set on the basis of the required vehicle drive torque at a moment of initiation of the power-on shift-up action, even if the required vehicle drive torque is lowered from the above-indicated value in the process of the power-on shift-up action. Accordingly, the power-on shift-up action is progressively implemented in a smooth manner. Meanwhile, the required vehicle drive torque is limited to the predetermined lower limit value, even when the required vehicle drive torque is reduced, making it possible to reduce a risk of loss of the balance between the input torque of the step-variable transmission and the torque capacity of the selected coupling device in the process of the power-on shift-up action. Thus, the control apparatus assures not only smooth progressive implementation of the power-on shift-up action of the step-variable transmission, but also prevention or reduction of its shifting shock.

According to the third mode of the invention, the limitation of the required vehicle drive torque is terminated when the degree of progress of the power-on shift-up action has reached the predetermined value. Accordingly, the required vehicle drive torque is adequately limited during a period of time in which there is a risk of generation of the shifting shock of the step-variable transmission due to reduction of its input torque. In other words, the input torque of the step-variable transmission is controlled according to the non-limited required vehicle drive torque based on the operation amount of the accelerator pedal, after the risk of generation of the shifting shock has been sufficiently reduced.

According to the fourth mode of the invention, the predetermined lower limit of the required vehicle drive torque is set on the basis of a kind of the power-on shift-up action or a rotating speed of the input rotary member of the step-variable transmission. Accordingly, the control apparatus permits the power-on shift-up action to be adequately implemented, while preventing or reducing the shifting shock of the step-variable transmission due to reduction of the input torque of the step-variable transmission.

According to the fifth mode of the invention, the control apparatus is configured to control the vehicle provided with the engine and the motor/generator (second motor/generator) functioning as the drive power source, and the differential mechanism and the step-variable transmission disposed in series with each other. The control apparatus is configured to reduce the amount of reduction of the input torque of the step-variable transmission to be controlled on the basis of the required vehicle drive torque, even if the accelerator pedal is turned off in the process of the power-on shift-up action of the step-variable transmission. Thus, the control apparatus according to this fifth mode of the invention is configured to reduce the risk of loss of the balance between the input torque of the step-variable transmission and the torque capacity of the selected coupling device in the process of the power-on shift-up action. Accordingly, it is possible to prevent or reduce the shifting shock of the step-variable transmission due to reduction of the input torque of the step-variable transmission during its power-on shift-up action.

DETAILED DESCRIPTION OF PREFERRED EMBODIMENTS

Figure 1:
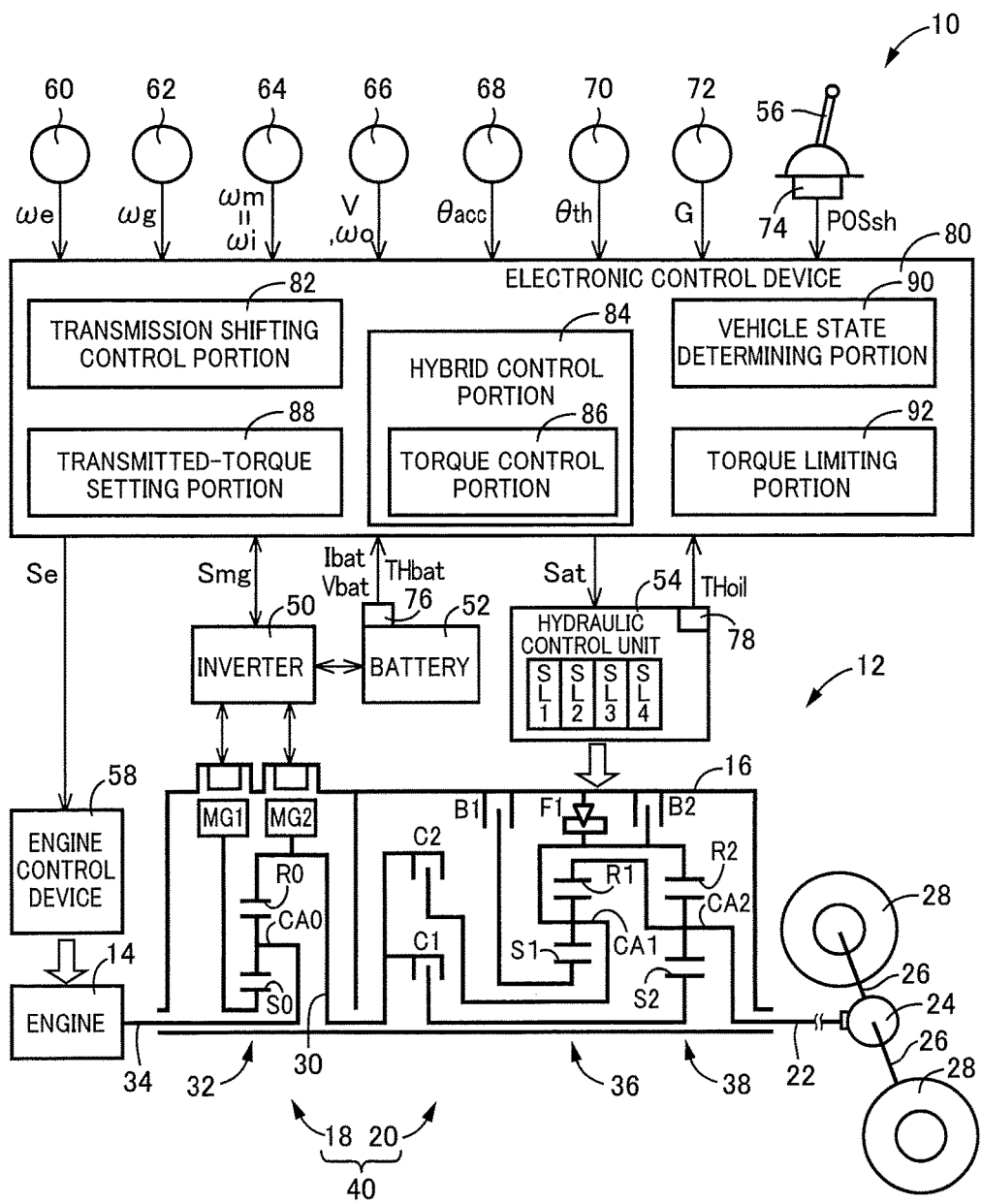
FIG. 1 is a schematic view showing an arrangement of a drive system of a vehicle to be controlled by a control apparatus according to the present invention, and major control functions and control portions of the control apparatus.

In the following embodiments of the invention, values representing the states of rotary motions of rotary members such as the above-described engine, motor/generator, first motor/generator, second motor/generator, rotary elements of the differential mechanism, intermediate power transmitting member and rotary elements of the step-variable transmission include rotating speeds $\omega$, and angular acceleration values $d\omega/dt$ of the rotary members. The rotating speeds $\omega$ of the rotary members correspond to angular velocities of the rotary members, and the angular acceleration values $d\omega/dt$ of the rotary members are rates of change of the rotating speeds co, namely, time derivative values of the rotating speeds $\omega$. In the mathematical equation (1) given below, the angular acceleration values $d\omega/dt$ are represented by co with a dot superposed thereon.

Referring to the drawings, preferred embodiments of the present invention will be described in detail.

First Embodiment

Reference is first made to FIG. 1, which is the schematic view showing an arrangement of a drive system 12 of a vehicle 10 to be controlled by a control apparatus according to the present invention, and major portions of the control apparatus to perform various controls of the vehicle 10. As shown in FIG. 1, the vehicular drive system 12 is provided with an engine 14 functioning as a drive power source, an electrically controlled continuously variable transmission portion 18 (hereinafter referred to as "continuously variable transmission portion 18") connected directly or indirectly via a damper (not shown) or any other device to the engine 14, and a mechanically operated step-variable transmission portion 20 (hereinafter referred to as "step-variable transmission portion 20) connected to an output rotary member of the continuously variable transmission portion 18. The continuously variable transmission portion 18 and the step-variable transmission portion 20 are disposed in series with each other within a transmission casing 16 (hereinafter referred to as "casing 16") functioning as a non-rotative member fixed to a vehicle body, such that the transmission portions 18 and 20 are disposed coaxially with each other on a common axis. The vehicular drive system 12 is further provided with a differential gear mechanism 24 connected to an output rotary member of the step-variable transmission portion 20 in the form of an output shaft 22, and a pair of axles 26 connected to the differential gear mechanism 24. In the vehicular drive system 12, a drive force ("drive torque" or "drive power" unless otherwise distinguished from the drive force) of the engine 14 and a second motor/generator MG2 (described below) is transmitted to the step-variable transmission portion 20, and is transmitted from the step-variable transmission portion 20 to drive wheels 28 of the vehicle 10 through the differential gear mechanism 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the continuously variable transmission portion 18 and the step-variable transmission portion 20 are constructed substantially symmetrically with each other about the axis of the engine 14 (about the above-indicated common axis, and that FIG. 1 does not show the lower halves of the transmission portions 18 and 20.

The engine 14 is the drive power source to drive the vehicle 10, which is a known internal combustion engine such as a gasoline engine or a diesel engine. An engine torque Te which is an output torque of this engine 14, is controlled by an electronic control device 80 (described below) which controls the operating condition of the engine 14 as represented by an opening angle of a throttle valve or an intake air quantity, an amount of injection of a fuel and an ignition timing. In the present embodiment, the engine 14 is connected to the continuously variable transmission portion 18, without a fluid-operated type power transmitting device such as a torque converter or a fluid coupling being disposed between the engine 14 and the transmission portion 18.

The continuously variable transmission portion 18 is provided with: a first motor/generator MG1; a differential mechanism 32 functioning as a power distributing device to mechanically distribute the drive force of the engine 14 to the first motor/generator MG1, and to an intermediate power transmitting member 30 which is an output rotary member of the continuously variable transmission portion 18; and a second motor/generator MG2 operatively connected to the intermediate power transmitting member 30. The continuously variable transmission portion 18 is an electrically controlled continuously variable transmission wherein a differential state of the differential mechanism 32 is controllable by controlling an operating state of the first motor/generator MG1. The first motor/generator MG1 functions as a differential motor/generator (a differential motor) while the second motor/generator MG2 is a motor/generator (an electric motor) which functions as a drive power source, namely, a vehicle driving motor/generator. The vehicle 10 is a hybrid vehicle provided with the drive power source in the form of the engine 14 and the second motor/generator MG2.

Each of the first motor/generator MG1 and the second motor/generator MG2 is an electrically operated rotary device having a function of an electric motor and a function of an electric generator. The first motor/generator MG1 and the second motor/generator MG2 are connected to an electric power storage device in the form of a battery 52 through an inverter 50. The inverter 50 provided on the vehicle 10 is controlled by the control apparatus in the form of the above-indicated electronic control device 80 described below in detail, to control an output torque (regenerative torque) of the first motor/generator MG1, namely, an MG1 torque Tg, and an output torque (forward driving torque) of the second motor/generator MG2, namely, an MG2 torque Tm. The battery 52 also provided on the vehicle 10 is the electric power storage device to and from which an electric power is supplied from and to the first motor/generator MG1 and the second motor/generator MG2.

The differential mechanism 32 is a planetary gear set of a single-pinion type having a sun gear S0, a carrier CA0 and a ring gear R0. The carrier CA0 is operatively connected to the engine 14 through a connecting shaft 34 in a power transmittable manner, and the sun gear S0 is operatively connected to the first motor/generator MG1 in a power transmittable manner, while the ring gear R0 is operatively connected to the second motor/generator MG2 in a power transmittable manner. In the differential mechanism 32, the carrier CA0 functions as an input rotary element, and the sun gear S0 functions as a reaction rotary element, while the ring gear R0 functions as an output rotary element.

The step-variable transmission portion 20 is a step-variable transmission which constitutes a part of a power transmitting path between the intermediate power transmitting member 30 and the drive wheels 28. The intermediate power transmitting member 30 also functions as an input rotary member of the step-variable transmission portion 20. The step-variable transmission portion 20 is considered to also constitute a part of a power transmitting path between the drive power source (second motor/generator MG2 or engine 14) and the drive wheels 28, since the second motor/generator MG2 is connected to the intermediate power transmitting member 30 such that the intermediate power transmitting member 30 is rotated together with the second motor/generator MG2, or since the engine 14 is connected to an input rotary member of the continuously variable transmission portion 18. The step-variable transmission portion 20 is a known automatic transmission of a planetary gear type which is provided with a plurality of planetary gear sets in the form of a first planetary gear set 36 and a second planetary gear set 38, and a plurality of coupling devices in the form of a clutch C1, a clutch C2, a brake B1 and a brake B2 (hereinafter referred to as "coupling devices CB" unless otherwise specified).

Each of the coupling devices CB is a hydraulically operated frictional coupling device in the form of a multiple-disc type or a single-disc type clutch or brake that is operatively pressed by a hydraulic actuator, or a band brake that is operatively tightened by a hydraulic actuator. The coupling devices CB are selectively placed in engaged, slipped or released states with their torque capacities (engaging torque values or CB-transmitted torque values) Tcb being changed according to engaging hydraulic pressures PRcb applied thereto, which are regulated by respective solenoid-operated valves SL1-SL4 incorporated within a hydraulic control unit 54. In order for each coupling device CB to be able to transmit a torque (for example, an AT input torque Ti which is an input torque of the step-variable transmission portion 20) between the intermediate power transmitting member 30 and the output shaft 22, without a slipping action (without a speed difference between input and output rotary elements of the coupling device CB), the relevant coupling device CB should be given an engaging torque Tcb enough to permit transmission of a component of the input torque, which is assigned to be transmitted by the coupling device CB in question, that is, to permit transmission of an assigned torque (CB-transmitted torque) to be transmitted through an engaging action of the coupling device CB. However, it is noted that an increase of the engaging torque Tcb enough to obtain the CB-transmitted torque does not cause an increase of the CB-transmitted torque. That is, the engaging torque Tcb is equivalent to a maximum value of the torque that can be transmitted through the coupling device CB, and the CB-transmitted torque is equivalent to the torque that is actually transmitted through the coupling device CB. Therefore, the engaging torque Tcb and the CB-transmitted torque are equal to each other in the process of the engaging action of the coupling device CB with a speed difference between its input and output rotary elements. In the present embodiment, the CB-transmitted torque in the process of a shifting action of the step-variable transmission portion 20 with a speed difference of the input and output rotary elements (for example, the CB-transmitted torque during an inertia phase of the shifting action) is represented by the engaging torque Tcb (namely, CB-transmitted torque Tcb). It is noted that the engaging torque (CB-transmitted torque) Tcb and the engaging hydraulic pressure PRcb are proportional to each other, before the engaging hydraulic pressure PRcb has been raised to initiate an engaging contact of the input and output rotary elements with each other.

In the step-variable transmission portion 20, selected ones of rotary elements (sun gears S1 and S2, carriers CA1 and CA2, and ring gears R1 and R2) of the first and second planetary gear sets 36 and 38 are connected to each other or to the intermediate power transmitting member 30, casing 16 or output shaft 22, either directly or indirectly (selectively) through the coupling devices CB or a one-way clutch F1.

The step-variable transmission portion 20 is shifted to a selected one of four AT gear positions (speed positions) by engaging actions of selected ones of the coupling devices CB. These four AT gear positions have respective different speed ratios γat (=AT input speed ωi/AT output speed ωo). Namely, the step-variable transmission portion 20 is shifted up and down from one gear position to another by placing selected ones of the coupling devices CB in the engaged state. The AT input speed ωi is a rotating speed (angular velocity) of the input rotary member of the step-variable transmission portion 20, that is, a rotating speed of the intermediate power transmitting member 30, which is equal to an MG2 speed ωm which is an operating speed of the second motor/generator MG2. Thus, the AT input speed ωi can be represented by the MG2 speed ωm. The AT output speed ωo is an rotating speed of the output shaft 22 of the step-variable transmission portion 20, which is considered to be an output speed of a transmission device 40 which consists of the continuously variable transmission portion 18 and the step-variable transmission portion 20.

Figures 2, 3:
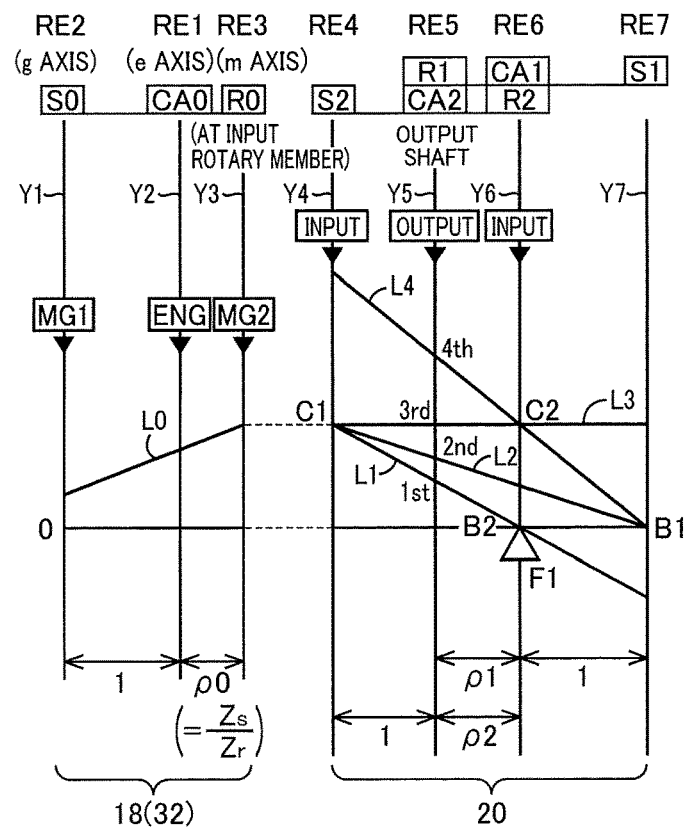
FIG. 2 is a table indicating a relationship between gear positions of a mechanically operated step-variable transmission portion shown in FIG. 1 and combinations of coupling devices placed in engaged states to establish the respective gear positions.
FIG. 3 is a collinear chart indicating a relationship among rotating speeds of rotary elements of an electrically controlled continuously variable transmission portion also shown in FIG. 1 and the mechanically operated step-variable transmission portion.

Reference is now made to FIG. 2, which is the table indicating the relationship between the first through fourth speed AT gear positions of the step-variable transmission portion 20 shown in FIG. 1 and combinations of the coupling devices CB placed in the engaged states to establish the respective AT gear positions. In the table, the four forward AT gear positions are respectively represented by "$1^{st}$", "$2^{nd}$", "$3^{rd}$" and "$4^{th}$". The first speed AT gear position "$1^{st}$" has a highest speed ratio γat, and the speed ratios γat of the four AT gear positions decrease in the direction from the first speed AT gear position (lowest-speed gear position) "$1^{st}$" toward the fourth speed AT gear position (highest-speed gear position) "$4^{th}$". In the table, "O" indicates the engaged state of the coupling devices CB, "Δ" indicates the engaged state of the coupling device B2 during application of an engine brake to the vehicle 10 or during a shift-down action of the step-variable transmission portion 20 while the vehicle 10 is in a coasting run, while the blank indicates the released state of the coupling devices CB. The one-way clutch F1 indicated above is disposed in parallel to the brake B2 which is placed in the engaged state to establish the first speed AT gear position "$1^{st}$", so that the brake B2 is not required to be placed in the engaged state upon starting or acceleration of the vehicle 10. The above-indicated shift-down action of the step-variable transmission portion 20 in the coasting run of the vehicle 10 is kind of a "power-off shift-down action" which is required as a result of reduction of a vehicle-speed-related value (vehicle running speed V, for example) due to reduction of a required drive force (as represented by an operation amount θacc of an accelerator pedal) or during deceleration of the vehicle 10 in a released position of the accelerator pedal (with the operation amount θacc of the accelerator pedal being zero or substantially zero), and is a shift-down action which is required during deceleration of the vehicle 10 in the released position of the accelerator pedal. It is noted that the step-variable transmission portion 20 is placed in a neutral position (a power transmission cutoff state) when all of the coupling devices CB are placed in the released states.

The step-variable transmission portion 20 is shifted up or down to establish a newly selected one of the four AT gear positions, according to the operation amount θacc of the accelerator pedal and the vehicle running speed V, with a releasing action of one of the coupling devices CB and a concurrent engaging action of another coupling device CB, which concurrent releasing and engaging actions are controlled by the above-indicated electronic control device 80, more specifically, by a transmission shifting control portion 82 configured to control shifting actions of the step-variable transmission portion 20. The above-indicated one coupling device CB was placed in the engaged state before the step-variable transmission portion 20 is shifted to establish the newly selected AT gear position, while the above-indicated another coupling device CB is placed in the engaged state while the step-variable transmission portion 20 is placed in the newly selected AT gear position. Thus, the step-variable transmission portion 20 is shifted up or down from one of the AT gear positions to another by so-called "clutch-to-clutch" shifting operation, namely, concurrent releasing and engaging actions of the selected two coupling devices CB. For instance, the step-variable transmission portion 20 is shifted down from the second speed AT gear position "$2^{nd}$" to the first speed AT gear position "$1^{st}$", with the releasing action of the brake B1 and the concurrent engaging action of the brake B2, as indicated in the table of FIG. 2. In this instance, the hydraulic pressures applied to the brakes B1 and B2 are transiently controlled to bring these brakes B1 and B2 into the released and engaged states, respectively.

The collinear chart of FIG. 3 indicates a relationship among rotating speeds of the rotary elements of the continuously variable transmission portion 18 and the step-variable transmission portion 20. In this collinear chart, three vertical lines Y1, Y2 and Y3 corresponding to the respective three rotary elements of the differential mechanism 32 of the continuously variable transmission portion 18 respectively represent a "g" axis representing the rotating speed of the second rotary element RE2 in the form of the sun gear S0, an "e" axis representing the rotating speed of the first rotary element RE1 in the form of the carrier CA0, and an "m" axis representing the rotating speed of the third rotary element RE3 in the form of the ring gear R0 (i.e., the input rotating speed of the step-variable transmission portion 20). Further, four vertical lines Y4, Y5, Y6 and Y7 corresponding to the respective four rotary elements of the step-variable transmission portion 20 respectively represent an axis representing the rotating speed of the fourth rotary element RE4 in the form of the sun gear S2, an axis representing the rotating speed of the fifth rotary element RE5 in the form of the ring gear R1 and the carrier CA2 fixed to each other, namely, the rotating speed of the output shaft 22, an axis representing the rotating speed of the sixth rotary element RE6 in the form of the carrier CA1 and the ring gear R2 fixed to each other, and an axis representing the rotating speed of the seventh rotary element RE7 in the form of the sun gear S1. The distances between the adjacent ones of the vertical lines Y1, Y2 and Y3 are determined by a gear ratio ρ0 of the differential mechanism 32, while the distances between the adjacent ones of the vertical lines Y4-Y7 are determined by gear ratios ρ1 and ρ2 of the respective first and second planetary gear sets 36 and 38. Where the distance between the axis representing the rotating speed of the sun gear S0, S1, S2 and the axis representing the rotating speed of the carrier CA0, CA1, CA2 corresponds to "1", the distance between the axis representing the rotating speed of the carrier CA0, CA1, CA2 and the axis representing the rotating speed of the ring gear R0, R1, R2 corresponds to the gear ratio ρ of the planetary gear set (=number of teeth Zs of the sun gear/number of teeth Zr of the ring gear).

Referring to the collinear chart of FIG. 3, the differential mechanism 32 of the continuously variable transmission portion 18 is arranged such that the engine 14 (represented as "ENG" in the collinear chart) is connected to the first rotary element RE1, and the first motor/generator MG1 (represented as "MG1" in the collinear chart) is connected to the second rotary element RE2, while the second motor/generator MG2 (represented as "MG2" in the collinear chart) is connected to the third rotary element RE3 which is rotated together with the intermediate power transmitting member 30. Thus, a rotary motion of the engine 14 is transmitted to the step-variable transmission portion 20 through the intermediate power transmitting member 30. In a part of the collinear chart corresponding to the continuously variable transmission portion 18, a straight line L0 intersecting the vertical line Y2 represents a relationship between the rotating speeds of the sun gear S0 and the ring gear R0.

The step-variable transmission portion 20 is arranged such that the fourth rotary element RE4 is selectively connected to the intermediate power transmitting member 30 through the clutch C1, the fifth rotary element RE5 is connected to the output shaft 22, the sixth rotary element RE6 is selectively connected to the intermediate power transmitting member 30 through the clutch C2 and is selectively connected to the casing 16 through the brake B2, and the seventh rotary element RE7 is selectively connected to the casing 16 through the brake B1. In a part of the collinear chart corresponding to the step-variable transmission portion 20, straight lines L1, L2, L3 and L4 intersecting the vertical line Y5 represent the rotating speeds of the output shaft 22 in the respective first, second, third and fourth speed AT gear positions "$1^{st}$", "$2^{nd}$", "$3^{rd}$" and "$4^{th}$" that are selectively established by control for engaging and releasing the coupling devices CB.

Solid straight lines L0, L1, L2, L3 and L4 shown in the collinear chart of FIG. 3 indicate the relative rotating speeds of the rotary elements in a hybrid drive mode in which the vehicle 10 is driven in the forward direction with at least the engine 14 being operated as a drive power source. In the differential mechanism 32 during this hybrid drive mode, when a torque Te of the engine 14 (engine torque Te) is applied to the carrier CA0 while a reaction torque which is a negative torque generated by the first motor/generator MG1 operated in the positive direction is applied to the sun gear S0, a directly transmitted engine torque Td (=Te/(1+ρ) =−(1/ρ)*Tg) which is a positive torque is applied to the ring gear R0 and rotating the ring gear R0 in the positive direction. The vehicle 10 is driven in the forward direction with a vehicle drive torque which is a sum of the directly transmitted engine torque Td and the MG2 torque Tm and which is transmitted to the drive wheels 28 through the step-variable transmission portion 20 selectively placed in one of the first through fourth speed AT gear positions according to required vehicle drive force. At this time, the first motor/generator MG1 functions as an electric generator operated in the positive direction and generating a negative torque. An electric power Wg generated by the first motor/generator MG1 is stored in the battery 52 or consumed by the second motor/generator MG2. The second motor/generator MG2 is operated to generate the MG2 torque Tm, with all or a part of the electric power Wg generated by the first motor/generator MG1, or a sum of the generated electric power Wg and the electric power supplied from the battery 52.

In the differential mechanism 32 during a motor drive mode in which the vehicle 10 is driven with a drive force generated by the second motor/generator MG2 operated as a drive power source while the engine 14 is held at rest, the carrier CA0 is held stationary while the MG2 torque Tm which is a positive torque is applied to the ring gear R0 and rotating the ring gear R0 in the positive direction. The state of the differential mechanism in this motor drive mode is not shown in the collinear chart of FIG. 3. At this time, the first motor/generator MG1 connected to the sun gear S0 is placed in a non-load state and freely operated in the negative direction. Namely, in the motor drive mode, the engine 14 is held in non-operated state, so that an operating speed $\omega e$ of the engine 14 (engine speed $\omega e$) is kept zero, and the vehicle 10 is driven in the forward direction with the MG2 torque Tm (positive forward driving torque), which is transmitted as a forward drive torque to the drive wheels 28 through the step-variable transmission portion 20 placed in one of the first through fourth speed AT gear position. When the vehicle 10 is driven in the rearward direction, in the motor drive mode, for example, the MG2 torque Tm which is a negative torque is applied to the ring gear R0 and rotating the ring gear R0 in the negative direction, and is transmitted as rear drive torque of the vehicle 10 to the drive wheels 28 through the step-variable transmission portion 20 placed in the first speed AT gear position.

In the vehicular drive system 12, the continuously variable transmission portion 18 functions as an electrically controlled shifting mechanism (electrically controlled differential mechanism) provided with the differential mechanism 32 the differential state of which is controlled by controlling the operating state of the first motor/generator MG1, and which has the three rotary elements, that is, the first rotary element RE1 in the form of the carrier CA0 to which the engine 14 is operatively connected in a power transmittable manner, the second rotary element RE2 in the form of the sun gear S0 to which the first motor/generator MG1 is operatively connected in a power transmittable manner, and the third rotary element RE3 in the form of the ring gear R0 to which the intermediate power transmitting member 30 is connected (in other words, to which the second motor/generator MG2 is operatively connected). Namely, the continuously variable transmission portion 18 has the differential mechanism 32 to which the engine 14 is operatively connected in a power transmittable manner, and the first motor/generator MG1 to which the differential mechanism 32 is operatively connected in a power transmittable manner, and the operating state of which is controlled to control the differential state of the differential mechanism 32. The continuously variable transmission portion 18 is operated as an electrically controlled continuously variable transmission a speed ratio $\gamma 0$ ($=\omega e/\omega m$) of which is variable. The speed ratio is a ratio of rotating speed of the connecting shaft 34 (namely, engine speed $\omega e$) to the rotating speed of the intermediate power transmitting member 30 (namely, MG2 speed $\omega m$).

In the hybrid drive mode, for instance, the rotating speed of the sun gear S0 is raised or lowered by controlling operating speed of the first motor/generator MG1 while the rotating speed of the ring gear R0 is determined by the rotating speed of the drive wheels 28 with the step-variable transmission portion 20 placed in one of the AT gear positions, so that the rotating speed of the carrier CA0 (namely, engine speed $\omega e$) is accordingly raised or lowered. In running with operation of the engine 14, therefore, the engine 14 can be operated at an efficient operating point. That is, the step-variable transmission portion 20 to be placed in a selected one of the AT gear positions and the continuously variable transmission portion 18 functioning as a continuously variable transmission cooperate to provide the transmission device 40 in which the continuously variable transmission portion 18 (differential mechanism 32) and the step-variable transmission portion 20 are disposed in series with each other and which functions as a continuously variable transmission as a whole.

Alternatively, the continuously variable transmission portion 18 can be shifted like a step-variable transmission. Accordingly, the transmission device 40 constituted by the step-variable transmission portion 20 to be placed in one of the AT gear positions and the continuously variable transmission portion 18 which can be shifted like the step-variable transmission can be shifted like a step-variable transmission as a whole. That is, the step-variable transmission portion 20 and the continuously variable transmission portion 18 can be controlled to selectively establish a plurality of speed positions (hereinafter referred to as "overall speed positions" although it may be referred also to as "conceptual speed positions") having respective different values of a speed ratio $\gamma t$ ($=\omega e/\omega o$) which is a ratio of the engine speed $\omega e$ to the output speed $\omega o$. The speed ratio $\gamma t$ is an overall speed ratio of the transmission device 40 consisting of the continuously variable transmission portion 18 and the step-variable transmission portion 20 which are disposed in series with each other. The overall speed ratio $\gamma t$ is equal to a product of the speed ratio $\gamma 0$ of the continuously variable transmission portion 18 and the speed ratio $\gamma at$ of the step-variable transmission portion 20, namely, $\gamma t=\gamma 0*\gamma at$.

Figures 4, 5:
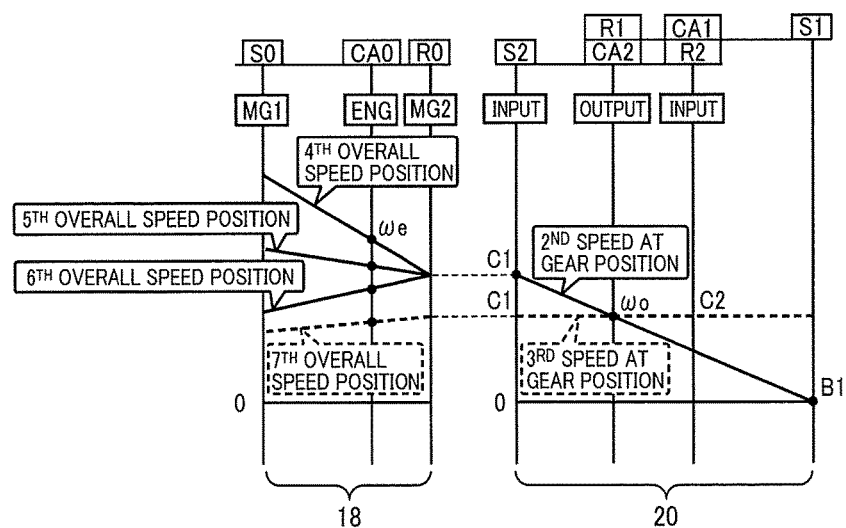
FIG. 4 is a table indicating an example of a plurality of overall speed positions of a transmission device in relation to the gear positions of the step-variable transmission portion.
FIG. 5 is a view indicating some examples of the gear positions of the step-variable transmission portion and some examples of the overall speed positions of the transmission device, on a collinear chart similar to that of FIG. 3.

At least one overall speed position is provided for each of the four AT gear positions of the step-variable transmission portion 20, with a combination of each AT gear position with at least one of the different speed ratio values $\gamma 0$ of the continuously variable transmission portion 18. FIG. 4 is the table indicating an example of the overall speed positions of the transmission device 40, wherein first through third overall speed positions are established for the first speed AT gear position, fourth through sixth overall speed positions are established for the second speed AT gear position, the seventh through ninth overall speed positions are established for the third speed AT gear position, and a tenth overall speed position is established for the fourth speed AT gear position.

FIG. 5 is the view indicating some examples of the AT gear positions of the step-variable transmission portion 20 and some examples of the overall speed positions of the transmission device 40, on a collinear chart similar to that of FIG. 3. In FIG. 5, solid lines indicate the fourth through sixth overall speed positions established when the step-variable transmission portion 20 is placed in the second speed AT gear position. In the transmission device 40, the continuously variable transmission portion 18 is controlled to control the engine speed ωe with respect to the output speed ωo for establishing the predetermined overall speed ratio values γt, to thereby establish the different overall speed position or positions for each of the AT gear positions. A broken line indicates the seventh overall speed position established when the step-variable transmission portion 20 is placed in the third speed AT gear position. In the transmission device 40, the continuously variable transmission portion 18 is controlled according to the selected one of the AT gear positions, for shifting the transmission device 40 from one of the overall speed positions to another.

Referring back to FIG. 1, the vehicle 10 is provided with the control apparatus in the form of the electronic control device 80 configured to control various devices of the vehicle 10 such as the engine 14, continuously variable transmission portion 18 and step-variable transmission portion 20. FIG. 1 is the view showing input and output signals of the electronic control device 80, and is a functional block diagram showing major control functions and control portions of the electronic control device, 80. For example, the electronic control device 80 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control device 80 may be constituted by two or more control units exclusively assigned to perform different control operations such as engine control operations and transmission shifting control operations.

The electronic control device 80 receives various input signals such as: an output signal of an engine speed sensor 60 indicative of the engine speed ωe; an output signal of an MG1 speed sensor 62 indicative of the MG1 speed ωg which is the operating speed of the first motor/generator MG1; an output signal of an MG2 speed sensor 64 indicative of the MG2 speed ωm which is the AT input speed ωi; an output signal of an output speed sensor 66 indicative of the output speed ωo corresponding to the vehicle running speed V; an output signal of an accelerator pedal operation amount sensor 68 indicative of the operation amount θacc of a vehicle accelerating member in the form of the accelerator pedal, which operation amount θacc represents a degree of acceleration of the vehicle 10 required by a vehicle operator; an output signal of a throttle valve opening angle sensor 70 indicative of an angle θth of opening of an electronic throttle valve; an output signal of an acceleration sensor 72 indicative of a longitudinal acceleration value G of the vehicle 10; an output signal of a shift position sensor 74 indicative of an operating position POSsh of a manually operated shifting member in the form of a shift lever 56 provided in the vehicle 10; output signals of a battery sensor 76 indicative of a temperature THbat, a charging/discharging electric current Ibat and a voltage Vbat of the battery 52; and an output signal of an oil temperature sensor 78 indicative of a temperature THoil of a working fluid used for operating hydraulic actuators of the coupling devices CB. Further, the electronic control device 80 generates various output signals such as: an engine control command signal Se to be applied to an engine control device 58 provided to control a throttle actuator, an fuel injecting device and an ignition device, for controlling the engine 14; motor/generator control command signals Smg to be applied to the inverter 50, for controlling the first motor/generator MG1 and the second motor/generator MG2; and hydraulic control command signals Sat to be applied to the hydraulic control unit 54, for controlling the operating states of the coupling devices CB (namely, for controlling the shifting actions of the step-variable transmission portion 20). The hydraulic control command signals Sat are command signals (drive currents) to be applied to the hydraulic control unit 54 for controlling amounts of electric currents to be applied to the solenoid-operated valves SL1-SL4 which regulate the engaging hydraulic pressure PRcb to be applied to each of the hydraulic actuators of the coupling devices CB. The electronic control device 80 operates to set a hydraulic pressure command value (command pressure) corresponding to the engaging hydraulic pressure PRcb to be applied to each of the hydraulic actuators, for establishing a target value of the engaging torque Tcb of the corresponding coupling device CB, and outputs a drive current corresponding to the hydraulic pressure command value.

The electronic control device 80 is configured to calculate a charging state (stored electric power amount) SOC of the battery 52 on the basis of the charging/discharging electric current Ibat and the voltage Vbat of the battery 52. The electronic control device 80 is further configured to calculate, based on, for example, the temperature THbat and the charging state SOC of the battery 52, a maximum charging amount Win of electric power that can be stored in the battery 52, and a maximum discharging amount Wout of electric power that can be discharged from the battery 52, which maximum charging and discharging amounts Win and Wout define a range of an electric power Pbat of the battery 52 that can be used. The calculated maximum charging and discharging amounts Win and Wout decrease with a decrease of the battery temperature THbat when the battery temperature THbat is lower than a normal level, and decreases with an increase of the battery temperature THbat when the battery temperature THbat is higher than the normal level. Further, the maximum charging amount Win decreases with an increase of the stored electric power amount SOC when the stored electric power amount SOC is relatively large. The maximum discharging amount Wout decreases with a decrease of the stored electric power amount SOC when the stored electric power amount SOC is relatively small.

The electronic control device 80 includes a shift control means or portion in the form of a transmission shifting control portion 82, and a hybrid control means or portion in the form of a hybrid control portion 84, for performing various controls in the vehicle 10.

The transmission shifting control portion 82 is configured to determine a shifting action of the step-variable transmission portion 20 according to a memory-stored AT gear position shifting map obtained by experimentation or determined by an appropriate design theory, and applies the hydraulic control command signals Sat to the hydraulic control unit 54, for commanding the solenoid-operated valves SL1-SL4 to bring the appropriate ones of the coupling devices CB into the released and engaged states, for automatically shifting up or down the step-variable transmission portion 20. The AT gear position shifting map indicated above is a predetermined relationship between two variables in the form of the output speed ωo (equivalent to the vehicle running speed V) and the accelerator pedal operation amount θacc (equivalent to a required drive torque Tdem and the throttle valve opening angle θth), which relationship is used to determine a shifting action of the step-variable transmission portion 20 and is represented by shift-up and shift-down shifting lines in a two-dimensional coordinate system in which the output speed ωo and the accelerator pedal operation amount θacc are taken along respective two axes.

The hybrid control portion 84 has a function of an engine control means or portion to control the engine 14, and a function of a motor/generator control means or portion to control the first motor/generator MG1 and the second motor/generator MG2 through the inverter 50. Thus, the hybrid control portion 84 performs hybrid drive controls for controlling the engine 14, first motor/generator MG1 and second motor/generator MG2. The hybrid control portion 84 is configured to calculate a required vehicle drive power Pdem on the basis of the accelerator pedal operation amount θacc and the vehicle running speed V, and according to a predetermined relationship in the form of a drive force map, for instance. In other words, the hybrid control portion 84 calculates the required drive torque Tdem at the present vehicle running speed V. The hybrid control portion 84 generates the engine control command signal Se to control the engine 14, and the motor/generator control command signals Smg to control the first motor/generator MG1 and the second motor/generator MG2, for establishing the required vehicle drive power Pdem, while taking account of the maximum charging and discharging amounts Win and Wout of electric power of the battery 52. For example, the engine control command signals Se represents a command value of an engine power Pe which is a power of the engine 14 outputting the torque Te at its present operating speed $\omega_e$. For example, the motor/generator control command signals Smg represent a command value of an electric power amount Wg to be generated by the first motor/generator MG1 to generate the reaction torque acting against the engine torque Te, namely, the MG1 torque Tg at the present MG1 speed $\omega_g$, and an electric power amount Wm to be consumed by the second motor/generator MG2 to generate the MG2 torque Tm at the present MG2 speed $\omega_m$.

When the transmission device 40 as a whole is operated as the continuously variable transmission while the continuously variable transmission portion 18 is operated as the continuously variable transmission, for instance, the hybrid control portion 84 controls the engine 14 and the electric power amount Wg to be generated by the first motor/generator MG1, so as to establish the engine speed $\omega_e$ and the engine torque Te for obtaining the engine power Pe to establish the required vehicle drive power Pdem, while taking account of a highest fuel economy point of the engine 14, so that the speed ratio $\gamma 0$ of the continuously variable transmission portion 18 is controlled so as to be continuously varied. As a result, the speed ratio $\gamma t$ of the transmission device 40 is controlled while the continuously variable transmission portion 18 is operated as the continuously variable transmission.

When the transmission device 40 as a whole is operated as the step-variable transmission while the continuously variable transmission portion 18 is operated as the step-variable transmission, for instance, the hybrid control portion 84 determines a shifting action of the transmission device 40 according to an overall speed position shifting map, for example, and performs a shifting control of the continuously variable transmission portion 18 to establish a selected one of the plurality of overall speed positions, in cooperation with the transmission shifting control portion 82 to shift the step-variable transmission portion 20 selectively to the AT gear positions. The plurality of overall speed positions can be established by controlling the first motor/generator MG1 to control the engine speed $\omega_e$ according to the output speed $\omega_o$ so as to maintain the respective speed ratio values $\gamma t$. It is noted that the speed ratio $\gamma t$ in each of the overall speed positions does not necessarily have to be constant over all ranges of the output speed $\omega_o$, but may be changed in a certain range or ranges of the output speed $\omega_o$ or may be given a limitation or limitations, for example, depending on upper and lower limits of rotating speeds of respective rotatable elements.

Figure 6:
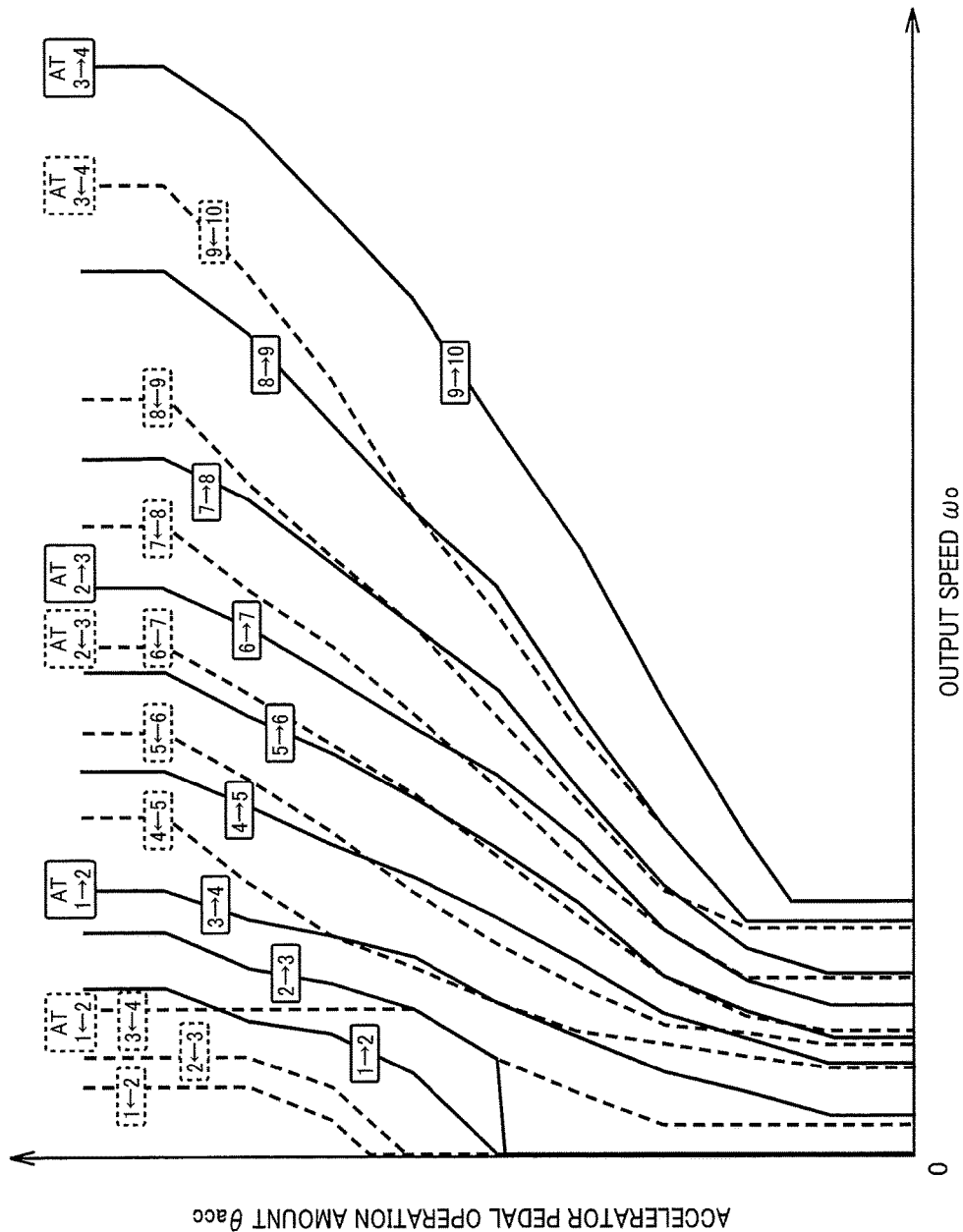
FIG. 6 is a view illustrating an example of an overall speed position shifting map used to shift up and down the transmission device from each of the overall speed positions to the adjacent position or positions.

Like the AT gear position shifting map, the above-indicated overall speed position shifting map is a relationship between the output speed $\omega_o$ and the accelerator pedal operation amount θacc as parameters. FIG. 6 is the view illustrating an example of the overall speed position shifting map. In FIG. 6, solid lines indicate shift-up boundary lines while broken lines indicate shift-down boundary lines. The transmission device 40 consisting of the continuously variable transmission portion 18 and the step-variable transmission portion 20 which are disposed in series with each other is shifted from one of the overall speed positions to another according to the overall speed position shifting map, as if the transmission device 40 was shifted like a step-variable transmission as a whole. This overall step-variable shifting control to control the shifting actions of the transmission device 40 as the step-variable transmission as a whole may be implemented preferentially to the continuously variable shifting control of the transmission device 40 as the continuously variable transmission as a whole, only when a sporty drive mode or any other high-drivability drive mode is selected by the vehicle operator, or only when the required drive torque Tdem is comparatively large, but may be principally implemented except where the overall step-variable shifting control is restricted or inhibited.

The overall step-variable shifting control by the hybrid control portion 84 and the shifting control of the step-variable transmission portion 20 by the transmission shifting control portion 82 are implemented in cooperation with each other. In this embodiment, the first through tenth overall speed positions are established for the first through fourth speed AT gear positions. When the transmission device 40 is shifted between the fourth overall speed position and the third overall speed position, for example, the step-variable transmission portion 20 is shifted between the second speed AT gear position and the first speed AT gear position. When the transmission device 40 is shifted between the seventh overall speed position and the sixth overall speed position, the step-variable transmission portion 20 is shifted between the third speed AT gear position and the second speed AT gear position. When the transmission device 40 is shifted between the tenth overall speed position and the ninth overall speed position, the step-variable transmission portion 20 is shifted between the fourth speed AT gear position and the third speed AT gear position. Therefore, the AT gear position shifting map is formulated so that the AT gear position shifting operation is performed in synchronization with the overall speed position shifting operation. Described more specifically by reference to FIG. 6, shift-up boundary lines for respectively shifting the transmission device 40 from the third overall speed position to the fourth overall speed position, from the sixth overall speed position to the seventh overall speed position, and from the ninth overall speed position to the tenth overall speed position coincide with shift-up boundary lines for respectively shifting the step-variable transmission portion 20 from the first speed AT gear position to the second speed AT gear position (indicated as "AT1→2" in FIG. 6), from the second speed AT gear position to the third speed AT gear position, and from the third speed AT gear position to the fourth speed AT gear position. Similarly, shift-down boundary lines for respectively shifting the transmission device 40 from the fourth overall speed position to the third overall speed position, from the seventh overall speed position to the sixth overall speed position, and from the tenth overall speed position to the ninth overall speed position coincide with shift-down boundary lines for respectively shifting the step-variable transmission portion 20 from the second speed AT gear position to the first speed AT gear position (indicated as "AT1←2" in FIG. 6), from the third speed AT gear position to the second speed AT gear position, and from the fourth speed AT gear position to the third speed AT gear position. Alternatively, a command to shift the step-variable transmission portion 20 may be applied to the transmission shifting control portion 82 in response to a determination according to the overall speed position shifting map of FIG. 6 that the transmission device 40 should be shifted from one overall speed position to another. Thus, a shift-up action of the transmission device 40 as a whole takes place upon a shift-up action of the step-variable transmission portion 20, and a shift-down action of the transmission device 40 as a whole takes place upon a shift-down action of the step-variable transmission portion 20. The transmission shifting control portion 82 commands the step-variable transmission portion 20 to perform a shifting action from one AT gear position to another, for shifting the transmission device 40 from one overall speed position to another. Since the AT gear position shifting operation is performed in synchronization with the overall speed position shifting operation, the shifting action of the step-variable transmission portion 20 is performed with a change of the engine speed $\omega e$, so that the vehicle operator is less likely to uncomfortably recognize a shifting shock of the step-variable transmission portion 20.

The hybrid control portion 84 selectively establishes the motor drive mode or the hybrid drive mode, depending upon running state of the vehicle 10. For example, the hybrid control portion 84 selects the motor drive mode when the required vehicle drive power Pdem is lower than a predetermined threshold value, that is, within a predetermined motor drive mode range, and selects the hybrid drive mode when the required vehicle drive power Pdem is equal to or higher than the threshold value, that is, within a predetermined hybrid drive mode range. Further, even when the required vehicle drive power Pdem is within the motor drive mode range, the hybrid control portion 84 selects the hybrid drive mode if the electric power amount SOC stored in the battery 52 is smaller than a predetermined threshold value.

Then, the overall step-variable shifting control of the transmission device 40 involving a shifting action of the step-variable transmission portion 20 will be described in detail. The hybrid control portion 84 includes a torque control portion 86 configured to control the MG1 torque Tg and the MG2 torque Tm during a shifting action of the step-variable transmission portion 20 under the control of the transmission shifting control portion 82 (more specifically, in the process of engaging and releasing actions of the relevant two coupling devices CB in an inertia phase of the shifting action), on the basis of the engine torque Te and the CB-transmitted torque Tcb of one of the two coupling devices CB to be respectively brought into its engaged and released states to permit the step-variable transmission portion 20 to perform the shifting action, wherein the one of the two coupling devices CB is an initiative coupling device, which causes the shifting action to progress, and CB-transmitted torque Tcb of which is controlled to progressively implement the shifting action, and such that an MG2 angular acceleration value $d\omega m/dt$ of the second motor/generator MG2 representing the rotating state of the input rotary member of the step-variable transmission portion 20, and an engine angular acceleration value $d\omega e/dt$ of the engine 14 representing the operating state of the engine 14 coincide with respective predetermined target values. By controlling the MG1 torque Tg and the MG2 torque Tm, the input torque Ti of the step-variable transmission portion 20 can be controlled since a sum of the MG2 torque and the directly transmitted engine torque Td applied to the ring gear R0 due to the reaction torque by the MG1 torque Tg that acts against the engine torque Te is equal to the input torque Ti of the step-variable transmission portion 20.

The shifting control of the step-variable transmission portion 20 is performed in various shifting modes such as a power-on shift-up mode, a power-off shift-up mode, a power-on shift-down mode and a power-off shift-down mode. For instance, the shifting controls in the power-on shifting modes are implemented when the accelerator pedal operation amount $\theta acc$ is increased or when the vehicle running speed V is raised while the accelerator pedal is kept in an operated position, and the shifting controls in the power-off shifting modes are implemented when the accelerator pedal operation amount $\theta acc$ is reduced or when the vehicle running speed V is lowered while the accelerator pedal is kept in its non-operated or fully released position. If none of the two coupling devices to be respectively brought into the released and engaged states is given the CB-transmitted torque Tcb, the AT input speed $\omega i$ is naturally raised to a predetermined optimum value in the power-on shifting modes, and is naturally lowered to a predetermined optimum value in the power-off shifting modes. Accordingly, the shifting action is preferably initiated by increasing the CB-transmitted torque Tcb of the coupling device CB which is to be brought into the engaged state for the shifting action, in the power-on shift-up and power-off shift-down modes in which the AT input speed $\omega i$ is not naturally changed to a predetermined synchronizing speed $\omega isyca$ (=$\omega o$*speed ratio $\gamma ata$ to be established after completion of the shifting action) if none of the two coupling devices to be respectively brought into the released and engaged states is given the CB-transmitted torque Tcb. On the other hand, the shifting action is preferably initiated by reducing the CB-transmitted torque Tcb of the coupling device CB which has been placed in the engaged state before the shifting action and which is to be brought into the released state for the shifting action, in the power-off shift-up and power-on shift-down modes in which the AT input speed $\omega i$ is naturally changed to the predetermined synchronizing speed $\omega isyca$ even if none of the two coupling devices to be respectively brought into the released and engaged states is given the CB-transmitted torque Tcb. Thus, the coupling device CB to be brought into the engaged state in the power-on shift-up and power-off shift-down modes is the initiative coupling device the CB-transmitted torque Tcb of which is controlled to progressively implement the shifting action, while the coupling device CB to be brought into the released state in the power-off shift-up and power-on shift-down modes is the initiative coupling device the CB-transmitted torque Tcb of which is controlled to progressively implement the shifting action.

Described more specifically, the hybrid control portion 84 (torque control portion 86) is configured to calculate the MG1 torque Tg and the MG2 torque Tm according to the following mathematical equation (1), and on the basis of the target values of the MG2 angular acceleration value $d\omega m/dt$ and the engine angular acceleration value $d\omega e/dt$, the engine torque Te, and an AT-transmitted torque Tat. The hybrid control portion 84 is configured to apply the motor/generator control command signals Smg to the inverter 50, so as to obtain the calculated MG1 torque Tg and MG2 torque Tm. For example, the mathematical equation (1) is derived from kinetic equations and a relationship equation. Each of the kinetic equations is established for a corresponding one of the "g", "e" and "m" axes of the continuously variable transmission portion 18 (indicated in FIG. 3), and is represented by an inertia value, an angular acceleration value and a torque value on the corresponding axis. The relationship equation is formulated in view of the continuously variable transmission portion 18 which has two degrees of freedom, (namely, in view of a fact that if the rotating speeds taken along two of the above-indicated three axes are determined, the rotating speed taken along the other axis is determined). Accordingly, values a11, . . . , b11, . . . , c22 in 2*2 matrices in the mathematical equation (1) represent combinations of parameters such as the inertia values of the rotary members of the continuously variable transmission portion 18, and the gear ratio ρ0 of the differential mechanism 32.

Mathematical Equation (1)

$$\begin{bmatrix} a_{11} & a_{12} \\ a_{21} & a_{22} \end{bmatrix} \begin{bmatrix} \dot{\omega}_m \\ \dot{\omega}_e \end{bmatrix} = \begin{bmatrix} b_{11} & b_{12} \\ b_{21} & b_{22} \end{bmatrix} \begin{bmatrix} T_m \\ T_g \end{bmatrix} + \begin{bmatrix} c_{11} & c_{12} \\ c_{21} & c_{22} \end{bmatrix} \begin{bmatrix} T_e \\ T_{at} \end{bmatrix} \quad (1)$$

For example, the target values of the MG2 angular acceleration value dωm/dt and the engine angular acceleration value dωe/dt in the mathematical equation (1) indicated above are predetermined so as to represent desired behaviors of the MG2 speed ωm and engine speed ωe during the shifting action, and depending upon the presently established one of the shifting modes of the step-variable transmission portion 20, the specific shifting action of the step-variable transmission portion 20 to be performed between the AT gear positions, and the specific shifting action of the transmission device 40 to be performed between the overall speed positions, namely, depending upon which one of the shifting modes (such as the above-described power-on shift-up mode, power-off shift-up mode, power-on shift-down mode and power-off shift-down mode) is to be performed in the step-variable transmission portion 20, between which AT speed positions the shifting action is to be performed in the step-variable transmission portion 20, and between which overall speed positions the shifting action is to be performed in the transmission device 40. Further, the target values are compensated as needed, during the shifting action. The engine torque Te in the mathematical equation (1) is a required engine torque Tedem at the engine speed ωe at which the engine power Pe for obtaining the required vehicle drive power Pdem (i.e. required engine power Pedem) is obtained.

The AT-transmitted torque Tat in the mathematical equation (1) is a sum of the torque values of the intermediate power transmitting member 30 (the rotating speed of which is taken along the "m" axis) which are obtained by conversion from the CB-transmitted torques Tcb transmitted through the respective two coupling devices CB during the relevant shifting action of the step-variable transmission portion 20, namely, the torque value of the intermediate power transmitting member 30 obtained by conversion from the torque transmitted through the step-variable transmission portion 20. The mathematical equation (1) is an equation for a theoretical model of the shifting action of the step-variable transmission portion 20. In this respect, the CB-transmitted torque Tcb of the initiative coupling device CB which is controlled to progressively implement the shifting action is used as the AT-transmitted torque Tat in the mathematical equation (1). The CB-transmitted torque Tcb used as the AT-transmitted torque Tat in the mathematical equation (1) is a feed-forward value.

To determine the desired CB-transmitted torque Tcb, the electronic control device 80 further includes a torque setting means or portion in the form of a torque setting portion 88 configured to set the CB-transmitted torque Tcb of the initiative coupling device CB. For instance, the torque setting portion 88 sets the CB-transmitted torque Tcb of the initiative coupling device CB on the basis of a required input torque (basic required vehicle drive torque) corresponding to the required vehicle drive power Pdem, and according to an appropriate one of a plurality of predetermined relationships between the CB-transmitted torque Tcb and the required input torque, which are formulated to ensure a good balance between the shifting shock and the required shifting time of the step-variable transmission portion 20 and which correspond to respective different combinations of the presently established shifting mode and the specific shifting action of the step-variable transmission portion 20 to be performed between the AT gear positions. For example, the basic required vehicle drive torque is a required vehicle drive torque Tidem of the intermediate power transmitting member 30 obtained by conversion from the required drive torque Tdem, or the AT input torque Ti corresponding to the required engine power Pedem for establishing the required drive power Pdem. Thus, the torque setting portion 88 sets the CB-transmitted torque Tcb of the initiative coupling device CB which is controlled to progressively implement the shifting action of the step-variable transmission portion 20, on the basis of the required vehicle drive torque Tidem (basic required vehicle drive torque) corresponding to the accelerator pedal operation amount θacc. Accordingly, the torque control portion 86 is considered to implement a feedback control of the MG2 torque Tm (namely, AT input torque Ti) on the basis of the required vehicle drive torque Tidem corresponding to the accelerator pedal operation amount θacc, such that the MG2 angular acceleration value dωm/dt representing the rotating state of the input rotary member of the step-variable transmission portion 20 coincides with the target value, that is, so that the shifting action of the step-variable transmission portion 20 is smoothly implemented.

By the way, the required vehicle drive torque Tidem may be negative when the accelerator pedal is turned off or returned to its non-operated position, since a regenerative brake may be applied to the vehicle 10 with a regenerative torque (negative torque) of the second motor/generator MG2.

Figure 9:
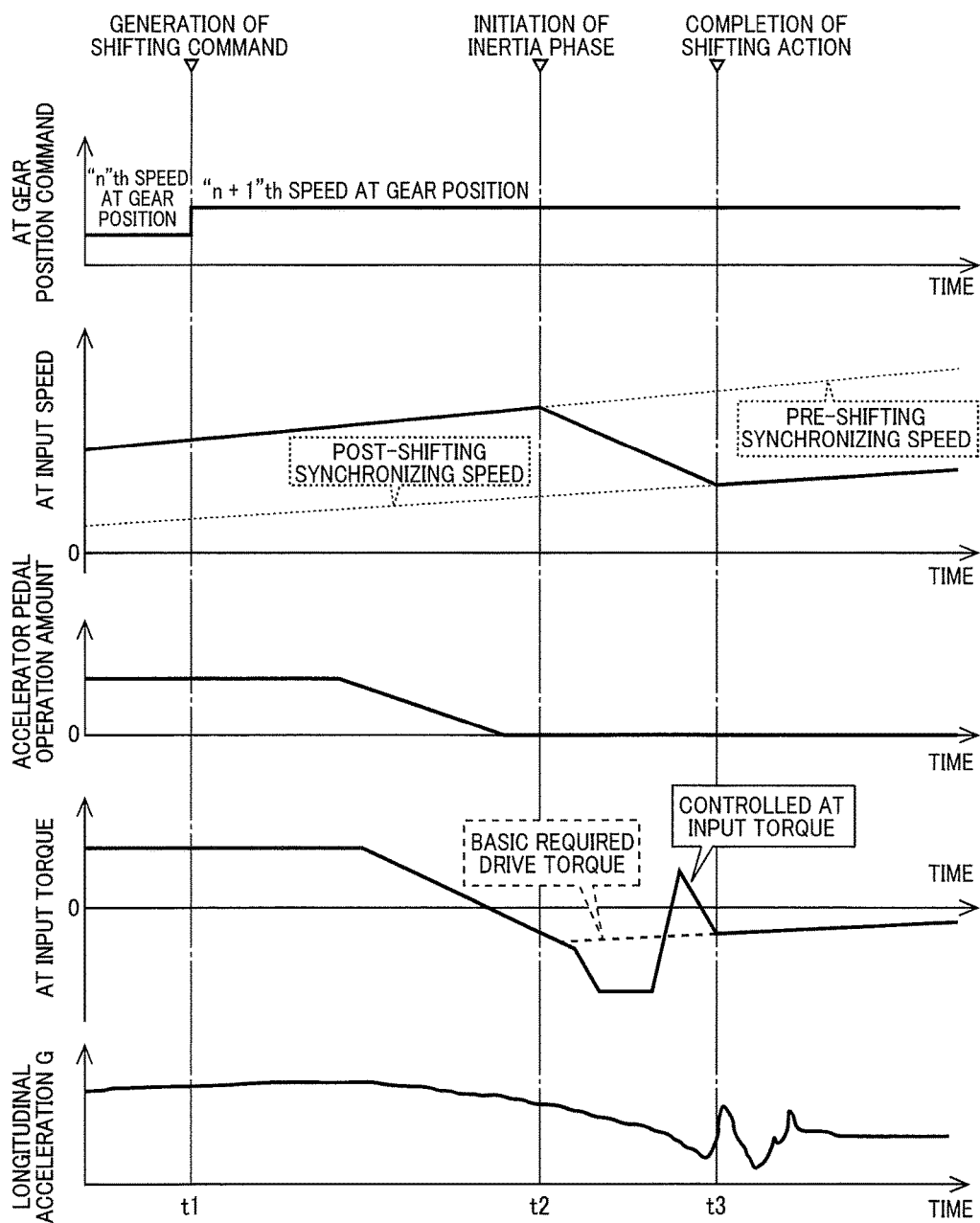
FIG. 9 is a time chart illustrating an example (comparative example) of changes of the various parameters where the transmission device is controlled according to the prior art when the accelerator pedal is turned off during the shift-up action of the step-variable transmission portion.

FIG. 9 is the time chart illustrating an example (comparative example not according to the present embodiment) of changes of various parameters where the transmission device 40 is controlled according to the prior art when the accelerator pedal is returned back to its non-operated position during a power-on shift-up action of the step-variable transmission portion 20 which was caused in response of placement of the accelerator pedal in an operated position, that is, which was caused in response to increase of the accelerator pedal operation amount θacc to a value larger than zero (or substantially zero). Referring to FIG. 9, a shifting command for implementing the shift-up action in response to the placement of the accelerator pedal in the operated position is generated at a point of time t1 (see a time chart of "AT GEAR POSITION COMMAND"). After generation of the shifting command, an inertia phase of the shift-up action is initiated at a point of time t2 at which reduction of the AT input speed (Di toward the post-shifting synchronizing speed ωisyca is initiated, and the shift-up action of the step-variable transmission portion 20 is progressively implemented. During the inertia phase between the point of time t2 and a point of time t3, the AT input torque Ti (indicated as "controlled torque" represented by a solid line) is feedback-controlled on the basis of the required vehicle drive torque Tidem (indicated as "basic required vehicle drive torque" represented by a broken line), so that the shift-up action is progressively implemented as needed. At the point of time t3, the AT input speed ωi is lowered to a value substantially equal to the post-shifting synchronizing speed ωisyca, so that the shift-up action is completed. In this respect, it is noted that during periods of time except the period of the inertia phase, the above-indicated feedback control of the AT input speed ωi is not implemented, and the AT input torque Ti follows the required vehicle drive torque Tidem. In the power-on shift-up action in the specific example of FIG. 9 in which the accelerator pedal is turned off (returned from the operated position to the non-operated or fully released position) during the shift-up action, the required vehicle drive torque Tidem is reduced from a positive value to a negative value. However, the torque setting portion 88 sets the CB-transmitted torque Tcb in the process of the power-on shift-up action, at the value of the coupling device CB (more specifically, the initiative coupling device CB) to be brought into the engaged state, which value is set on the basis of the required vehicle drive torque Tidem at the moment of initiation of (point of time t1) of the power-on shift-up action even when the required vehicle drive torque Tidem decreases during the power-on shift-up action. Accordingly, the reduction of the AT input torque Ti with the reduction of the required vehicle drive torque Tidem as a result of an operation of the accelerator pedal to the non-operated position in the power-on shift-up action causes a loss of balance between the AT input torque Ti and the CB-transmitted torque Tcb of the coupling device CB, giving rise to a risk of generation of a shifting shock of the step-variable transmission portion 20. In particular, the controlled AT input torque Ti is made equal to the required vehicle drive torque Tidem, namely, is changed back to the required vehicle drive torque Tidem, at the point of time t3, that is, at the moment of completion of the shift-up action or at the moment of termination of the above-indicated feedback control. Therefore, where the required vehicle drive torque Tidem is a negative value, the coupling device CB is brought into the engaged state when the AT input torque Ti is a negative value, giving rise to a risk of generation of a shifting shock of the step-variable transmission portion 20 involving generation of a rattling noise.

In view of the drawback described above, the electronic control device 80 is configured according to the present invention to limit the required vehicle drive torque Tidem to a predetermined lower limit value Tif in the process of the power-on shift-up action of the step-variable transmission portion 20. Accordingly, it is possible to limit the amount of reduction of the AT input torque Ti as a result of an operation of the accelerator pedal to its non-operated position in the process of the power-on shift-up action of the step-variable transmission portion 20 which is caused in response to placement of the accelerator pedal in an operated position, whereby it is possible to prevent or reduce the shifting shock of the step-variable transmission portion 20 due to the reduction of the AT input torque Ti.

Described in detail, the electronic control device 80 further includes a vehicle state determining means in the form of a vehicle state determining portion 90 and a torque limiting means in the form of a torque limiting portion 92, for limiting the required vehicle drive torque Tidem to the predetermined lower limit value Tif, as described above.

The vehicle state determining portion 90 is configured to determine, during running of the vehicle 10, whether the step-variable transmission portion 20 is in the process of a power-on shift-up action. This determination is made on the basis of the hydraulic pressure control command signals Sat. The vehicle state determining portion 90 is further configured to determine whether a degree of progress Rpm of the power-on shift-up action of the step-variable transmission portion 20 has reached a predetermined value Rprof. For example, the degree of progress Rpro of the power-on shift-up action is represented by a speed difference Δωi ($=\omega i-\omega isyca$) between the present AT input speed ωi and the post-shifting synchronizing speed ωisyca to be established after completion of the shift-up action, or by a ratio Rωi ($=D\omega i/D\omega iba$) of an amount of change Dωi of the actual AT input speed ωi in the process of the shift-up action with respect to an amount of change Dωiba ($=\omega isycb-\omega isyca$) of the AT input speed ωi which is to take place between the moments of initiation and completion of the shift-up action, wherein "ωisycb" represents the pre-shifting synchronizing speed value of the AT input speed ωi ($=\omega o*$speed ratio γatb of the step-variable transmission portion 20 before the relevant shift-up action). For instance, the predetermined degree of process value Rprof is a threshold value above which it is considered that there is no possibility or a low degree of possibility of generation of a shifting shock of the step-variable transmission portion 20 due to reduction of the AT input torque Ti even if the limitation of the required vehicle drive torque Tidem to the lower limit value Tif is cancelled. Preferably, the degree of process value Rprof is a threshold value at which the power-on shift-up action of the step-variable transmission portion 20 is considered to be completed.

The torque limiting portion 92 is configured to limit the required vehicle drive torque Tidem to the predetermined lower limit value Tif, such that the required vehicle drive torque Tidem does not become smaller than the lower limit value Tif, in the process of the power-on shift-up action of the step-variable transmission portion 20, if the vehicle state determining portion 90 has determined that the step-variable transmission portion 20 is in the process of in the power-on shift-up action. Preferably, the torque limiting portion 92 is configured to determine whether the required vehicle drive torque Tidem has been reduced to a value smaller than the predetermined lower limit value Tif in the process of the power-on shift-up action, and limit the required vehicle drive torque Tidem to the lower limit value Tif if an affirmative determination is obtained with respect to the amount of reduction of the required vehicle drive torque Tidem. The torque limiting portion 92 terminates the limitation of the required vehicle drive torque Tidem when the vehicle state determining portion 90 has determined that the degree of progress Rpro of the power-on shift-up action of the step-variable transmission portion 20 has reached the predetermined value Rprof.

For example, the predetermined lower limit value Tif is a lower limit value of the required vehicle drive torque Tidem above which the shifting shock due to reduction of the AT input torque Ti is not likely to take place. Preferably, the lower limit value Tif is determined so that the required vehicle drive torque Tidem is not reduced to a negative value, namely, determined to be zero or a positive value close to zero.

The degree of the shifting shock of the step-variable transmission portion 20 due to reduction of the AT input torque Ti, or the degree by which the vehicle operator uncomfortably recognizes the shifting shock, is considered to vary depending upon the specific power-on shift-up action of the step-variable transmission portion 20 from one of the AT gear positions to another, that is, depending upon between which AT speed positions the shift-up action is performed in the step-variable transmission portion 20. Further, the AT input speed $\omega i$ (=$\omega o$*speed ratio $\gamma at$) is a parameter relating to the vehicle running speed V and the AT gear position to be established, so that the degree of the shifting shock due to reduction of the AT input torque Ti or the degree by which the vehicle operator uncomfortably recognizes the shifting shock is considered to vary depending upon the vehicle running speed V and the specific AT gear position to be established. In view of these facts, the torque limiting portion 92 sets the lower limit value Tif of the required vehicle drive torque Tidem, on the basis of a kind of the shift-up action of the step-variable transmission portion 20, or the AT input speed $\omega i$. For example, the lower limit value Tif may be set at the moment of initiation of the power-on shift-up action of the step-variable transmission portion 20 and kept at the thus set value Tif throughout the shift-up action. However, the lower limit value Tif may be changed in the process of the power-on shift-up action of the step-variable transmission portion 20 on the basis of the AT input speed $\omega i$.

More preferably, the torque limiting portion 92 has a memory-stored predetermined lower limit determining map representative of a relationship between the lower limit value Tif of the required vehicle drive torque Tidem and a kind of the shift-up action of the step-variable transmission portion 20 or the AT input speed $\omega i$, which lower limit determining map or relationship is formulated so as to prevent or reduce the shifting shock of the step-variable transmission portion 20 due to reduction of the AT input torque Ti. The torque limiting portion 92 sets the lower limit value Tif according to the lower limit determining map and on the basis of the specific shift-up action or the AT input speed $\omega i$.

Figure 7:
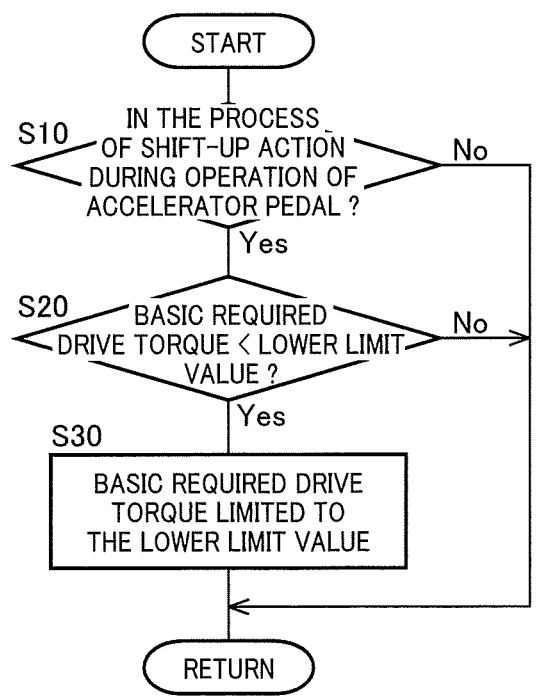
FIG. 7 is a flow chart illustrating an essential part of a control routine executed by an electronic control device, namely, a control operation to prevent or reduce a shifting shock of the step-variable transmission portion due to reduction of its input torque in the process of its shift-up action during an operation of an accelerator pedal.
Figure 8:
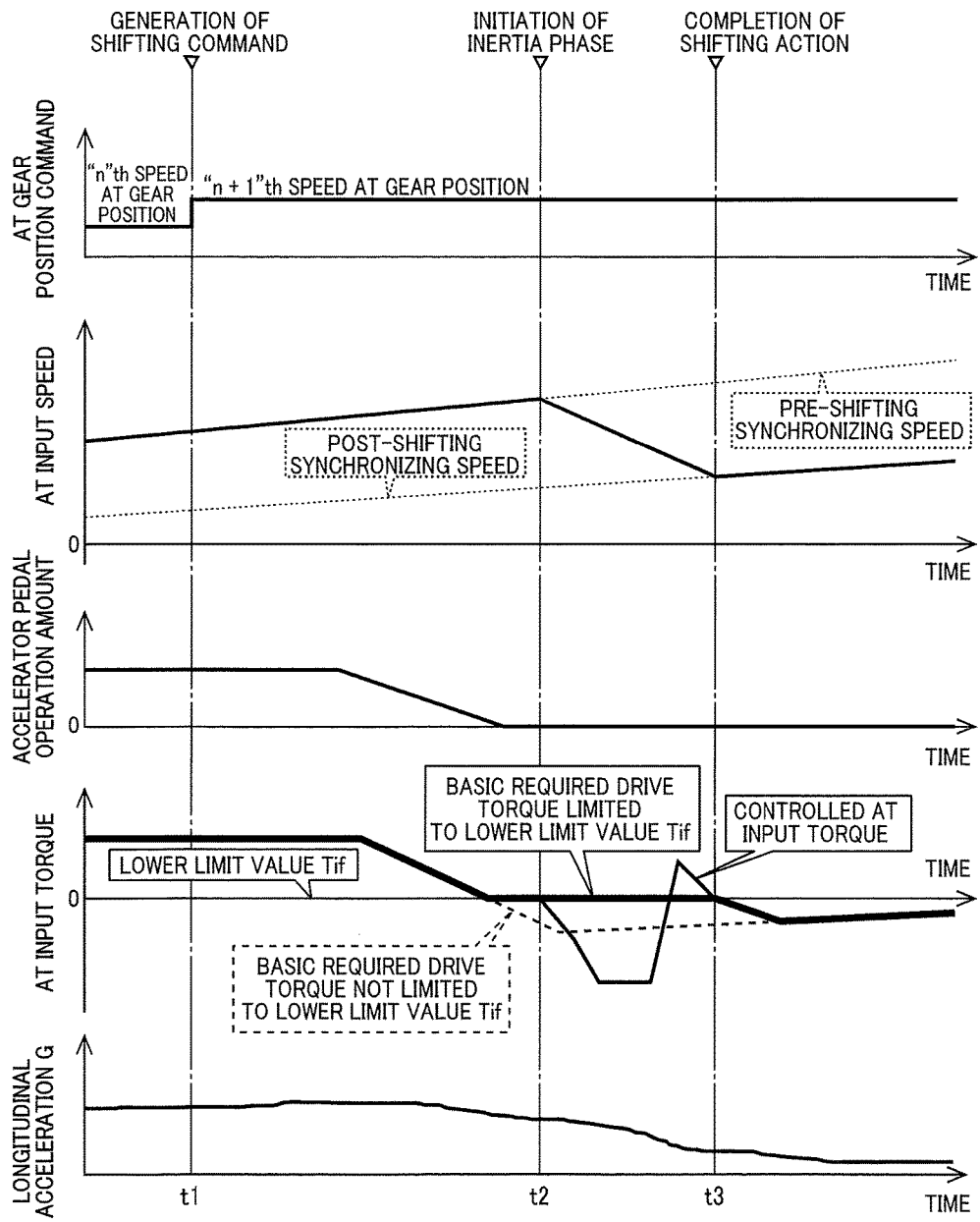
FIG. 8 is a time chart illustrating an example of changes of various parameters when the control routine illustrated in the flow chart of FIG. 7 is executed.

The flow chart of FIG. 7 illustrates an essential part of a main control routine executed by the electronic control device 80, that is, a control routine to prevent or reduce the shifting shock of the step-variable transmission portion 20 due to reduction of the AT input torque Ti in the process of its power-on shift-up action. For example, the control routine is repeatedly executed during running of the vehicle 10. FIG. 8 is the time chart illustrating an example of changes of various parameters when the control routine illustrated in the flow chart of FIG. 7 is executed.

The control routine of FIG. 7 is initiated with a step S10 corresponding to the function of the vehicle state determining portion 90, to determine whether the step-variable transmission portion 20 is in the process of a power-on shift-up action. If a negative determination is obtained in the step S10, one cycle of execution of the present control routine is terminated. If an affirmative determination is obtained in the step S10, the control flow goes to a step S20 corresponding to the function of the torque limiting portion 92, to determine whether the required vehicle drive torque Tidem is smaller than the predetermined lower limit value Tif. If a negative determination is obtained in the step S20, one cycle of execution of the control routine is terminated. If an affirmative determination is obtained in the step S20, the control flow goes to a step S30 also corresponding to the function of the torque limiting portion 92, to limit the required vehicle drive torque Tidem to the predetermined lower limit value Tif, namely, to keep the required vehicle drive torque Tidem at the lower limit value Tif.

As in the time chart of FIG. 9, the shifting command for implementing the power-on shift-up action is generated at the point of time t1, as indicated in the time chart of FIG. 8. The inertia phase of the shift-up action is initiated at the point of time t2, and the AT input speed of has been lowered to a value substantially equal to the post-shifting synchronizing speed $\omega isyca$, at the point of time t3, so that the shift-up action is completed. The required vehicle drive torque Tidem is reduced from a positive value to a negative value, in the process of the power-on shift-up action, when the accelerator pedal which has been placed in an operated position is returned back to its non-operated position. During the period of the inertia phase between the points of time t2 and t3, the AT input torque Ti is feedback-controlled on the basis of the required vehicle drive torque (basic required vehicle drive torque) Tidem, so that the shift-up action is progressively implemented as needed, as in the comparative example of FIG. 9. In the present embodiment, however, the required vehicle drive torque Tidem is limited to the lower limit value Tif, as indicated in FIG. 8 by a thick solid line representing the basic required vehicle drive torque limited to the lower limit value Tif, and the AT input torque Ti is controlled on the basis of the thus limited required vehicle drive torque Tidem, as indicated in FIG. 8 as the "controlled AT input torque". As a result, the reduction of the AT input torque Ti (controlled AT input torque) is limited (kept at the required vehicle drive torque Tidem kept at zero) at the completion of the shifting, so that the shifting shock of the step-variable transmission portion 20 is made smaller, in the present embodiment, than in the prior art in which the required vehicle drive torque Tidem is not limited and is reduced to a negative value as indicated in FIG. 8 by a broken line representing the basic required vehicle drive torque not limited to the lower limit value. In this respect, it is noted that the limitation of the required vehicle drive torque Tidem to the lower limit value Tif is cancelled at the moment of completion of the power-on shift-up action, so that the required vehicle drive torque Tidem and the controlled AT input torque Ti are not limited and are gradually reduced toward the non-limited values according to the accelerator pedal operation amount $\theta acc$.

The present embodiment described above is configured such that the required vehicle drive torque Tidem corresponding to the accelerator pedal operation amount $\theta acc$ is limited to the predetermined lower limit value Tif, namely, is not lowered below the lower limit value Tif, in the process of a power-on shift-up action. In the vehicle 10 which is provided with the engine 14 and second motor/generator MG2 functioning as the drive power source and in which the differential mechanism 32 and the step-variable transmission portion 20 are disposed in series with each other, the amount of reduction of the AT input torque Ti to be controlled on the basis of the required vehicle drive torque Tidem is reduced even when the accelerator pedal is returned to the non-operated position in the process of the power-on shift-up action. Thus, the present embodiment is configured to reduce a risk of loss of the balance between the AT input torque Ti and the CB-transmitted torque Tcb of the relevant coupling device CB in the process of the power-on shift-up action. Accordingly, it is possible to prevent or reduce a shifting shock of the step-variable transmission portion 20 due to reduction of the AT input torque Ti during its power-on shift-up action.

The present embodiment is further configured such that the CB-transmitted torque Tcb in the process of the power-on shift-up action of the initiative coupling device CB is set at the value set on the basis of the required vehicle drive torque Tidem at the moment of initiation of the power-on shift-up action, even if the required vehicle drive torque Tidem is lowered from the above-indicated value in the process of the power-on shift-up action. Accordingly, the power-on shift-up action is progressively implemented in a smooth manner. Meanwhile, the required vehicle drive torque Tidem is limited to the predetermined lower limit value, even when the required vehicle drive torque Tidem is reduced, making it possible to reduce a risk of loss of the balance between the input torque Ti of the step-variable transmission portion 20 and the CB-transmitted torque Tcb of the initiative coupling device in the process of the power-on shift-up action. Thus, the present embodiment assures not only smooth progressive implementation of the power-on shift-up action of the step-variable transmission portion 20, but also prevention or reduction of its shifting shock.

The present embodiment is also configured such that the limitation of the required vehicle drive torque Tidem is terminated when the degree of progress Rpro of the power-on shift-up action has reached the predetermined value Rprof. Accordingly, the required vehicle drive torque Tidem is adequately limited during a period of time in which there is a risk of generation of the shifting shock of the step-variable transmission portion 20 due to reduction of its input torque Ti. In other words, the input torque Ti of the step-variable transmission portion 20 is controlled according to the non-limited required vehicle drive torque Tidem based on the operation amount θacc of the accelerator pedal, after the risk of generation of the shifting shock has been sufficiently reduced.

The present embodiment is further configured such that the predetermined lower limit value Tif of the required vehicle drive torque Tidem is set on the basis of a kind of the power-on shift-up action of the step-variable transmission portion 20 or the AT input speed ωi. Accordingly, the present embodiment permits the power-on shift-up action to be adequately implemented, while preventing or reducing the shifting shock of the step-variable transmission portion 20 due to reduction of the AT input torque Ti.

While the preferred embodiment of this invention has been described in detail by reference to the drawings, it is to be understood that the invention may be otherwise embodied.

Second Embodiment

Figure 10:
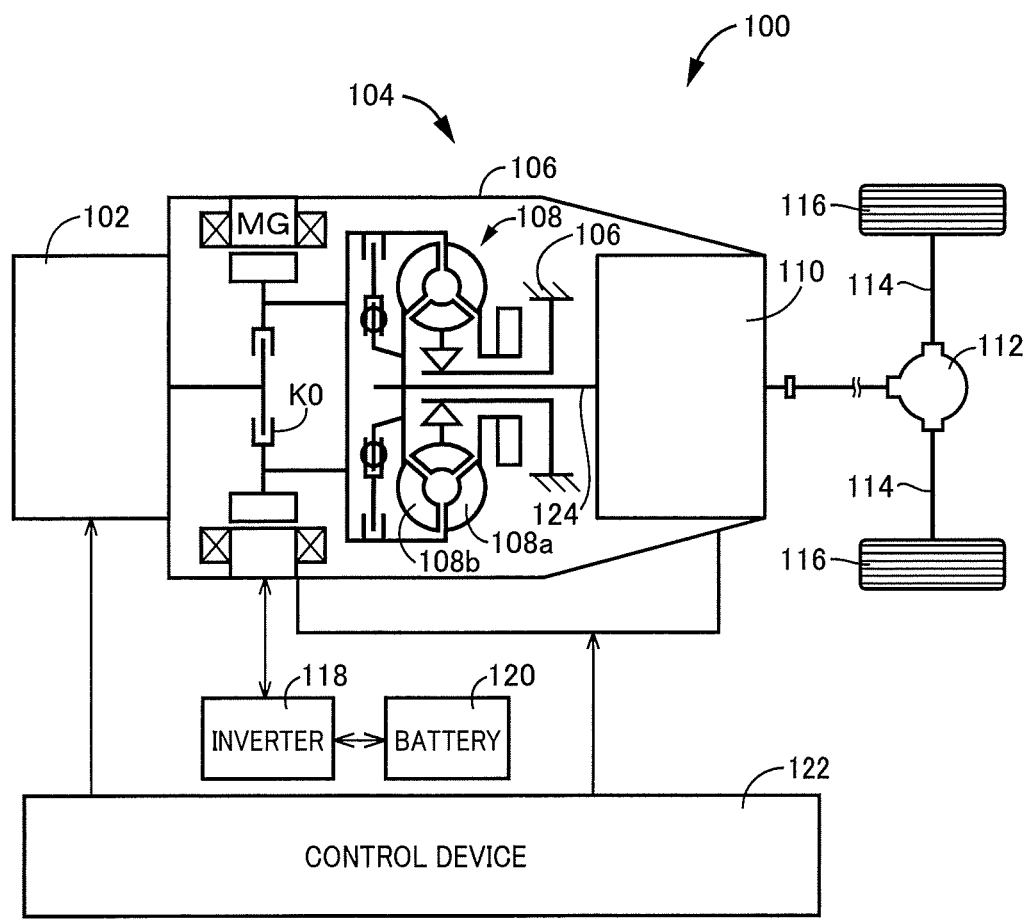
FIG. 10 is a schematic view showing an arrangement of another type of vehicular drive system different from that of FIG. 1, which is to be controlled by the control apparatus according to the present invention.

In the preceding first embodiment, the control apparatus is configured to control the vehicle 10 provided with the continuously variable transmission portion 18 and the step-variable transmission portion 20 which are disposed in series with each other. However, the control apparatus according to the present invention may be configured to control a vehicle 100 shown in FIG. 10. The vehicle 100 which is controlled by the control apparatus in the form of a control device 122 according to a second embodiment is a hybrid vehicle provided with an engine 102 and a motor/generator MG functioning as the drive power source, and a power transmitting system 104. As shown in FIG. 10, the power transmitting system 104 includes a clutch K0, a torque converter 108 and a step-variable transmission 110, which are disposed within a stationary member in the form of a casing 106 fixed to a body of the vehicle 100, in this order of description as seen in the direction from the engine 102. The power transmitting system 104 further includes a differential gear device 112 and axles 114. The torque converter 108 has a pump impeller 108a selectively connected to the engine 102 through the clutch K0 and directly connected to the motor/generator MG, and a turbine impeller 108b directly connected to the step-variable transmission 110. In the power transmitting system 104, a drive force of the engine 102 and/or a drive force of the motor/generator MG are/is transmitted to drive wheels 116 of the vehicle 100 through the clutch K0 (where the drive force of the engine 102 is transmitted), the torque converter 108, the step-variable transmission 110, the differential gear device 112 and the axles 114, in this order of description. The step-variable transmission 110 is an automatic transmission which constitutes a part of a power transmitting path between the drive power source (engine 102 and motor/generator MG) and the drive wheels 116, and which is placed in a selected one of a plurality of gear positions with an engagement of a selected one of a plurality of coupling devices. The vehicle 100 is further provided with an inverter 118, and an electric power storage device in the form of a battery 120 to and from which an electric power is respectively supplied from and to the motor/generator MG through the inverter 118, as well as the above-indicated control device 122. The control device 122 is configured to implement a feedback control of an output torque of the above-described drive power source (namely, an AT input torque Ti) during a shifting action of the step-variable transmission 110, on the basis of a required vehicle drive torque corresponding to the accelerator pedal operation amount θacc, such that a value representing a state of a rotary motion of an input shaft 124 which is an input rotary member of the step-variable transmission 110 coincides with a predetermined target value. Although the angular acceleration value of the input rotary member is used as the value representing the state of the rotary motion of the input rotary member, in the feedback control of the AT input torque Ti in the preceding first embodiment, other values such as rotating speed (angular velocity) of the input rotary member may be used as the value representing the state of the rotary motion of the input rotary member. Where the rotating speed of the input shaft 124 is used as the target value, for example, compensation of the AT input torque Ti may be implemented with a PI control known in the art to calculate a feedback control amount on the basis of a difference between the actual and target values of the rotating speed.

The vehicle 100 may not be provided with the engine 102, the clutch K0 and the torque converter 108. In this case, the motor/generator MG is directly connected to an input rotary member of the step-variable transmission 110. Namely, the control apparatus according to the present invention is applicable to a vehicle which is provided with a motor/generator functioning as a drive power source, and a step-variable transmission which constitutes a part of a power transmitting path between the drive power source and drive wheels and which is placed in a selected one of gear positions with engagement of a selected one or ones of a plurality of coupling devices. While the vehicle 100 uses the torque converter 108 as a fluid-operated power transmitting device, the vehicle 100 may use other types of fluid-operated power transmitting devices such as a fluid coupling not having a torque boosting function. Further, the torque converter 108 need not be provided, or may be replaced by a device having a simple clutch function.

In the illustrated first embodiment, the point of time at which the limitation of the required vehicle drive torque Tidem is terminated is determined on the basis of the degree of progress Rpro of the power-on shift-up action of the step-variable transmission portion 20 (that is, on the basis of the AT input speed ωi). However, the determination of this point of time may be made otherwise. For instance, the limitation of the required vehicle drive torque Tidem to the lower limit value Tif may be terminated when a predetermined length of time TMdsf has passed after a moment of initiation of the control of the power-on shift-up action of the step-variable transmission portion 20, or when a predetermined length of time TMinaf has passed after a moment of initiation of a change of the AT input speed ωi as a result of the power-on shift-up action (after a moment of initiation of the inertia phase of the shift-up action). The predetermined lengths of time TMdsf and TMinaf are predetermined threshold values above which it is possible to determine that there is no risk or a low risk of generation of a shifting shock of the step-variable transmission portion 20 due to reduction of the AT input torque Ti, even without the limitation of the required vehicle drive torque Tidem. In this respect, it is noted that since the rate of progress of the power-on shift-up action may vary with a change of a temperature THoil of a working fluid used for the step-variable transmission portion 20, the predetermined lengths of time TMdsf and TMinaf may be changed depending upon the working fluid temperature THoil.

In the illustrated embodiments, as shown in FIG. 8, the AT input torque Ti (controlled AT input torque Ti) is lowered to the required vehicle drive torque Tidem set at zero (basic required vehicle drive torque limited to the lower limit value Tif), at the point of time t3 of completion of the power-on shift-up action of the step-variable transmission portion 20 or the step-variable transmission 110. However, the controlled AT input torque Ti may be limited to the basic required vehicle drive torque limited to the lower limit value Tif, in the process of reduction of the AT input torque Ti finally to the required vehicle drive torque Tidem (basic required vehicle drive torque indicated by the broken line) set at a negative value, at the point of time of completion of the shift-up action, as indicated in FIG. 9. In this respect, the shift-up action may be implemented in a state in which the controlled AT input torque Ti is increased from a negative value finally to the required vehicle drive torque Tidem (basic required vehicle drive torque limited to the lower limit value Tif) set at zero, at the point of time of completion of the shift-up action. This control of the AT input torque Ti permits prevention or reduction of a risk of generation of the shifting shock of the step-variable transmission portion 20 or the step-variable transmission 110 involving a rattling noise in the process of an engaging action of the relevant coupling device CB while the AT input torque Ti is a negative value.

The manner of control of the shifting action of the transmission device 40 (for example, the shifting control according to the mathematical equation (1)) in the illustrated first embodiment is applicable to the shifting control of the step-variable transmission portion 20 while the transmission device 40 as a whole is operated as a continuously variable transmission, as well as the step-variable shifting control to shift the transmission device 40 to a selected one of the overall speed positions together with a shifting action of the step-variable transmission portion 20.

In the illustrated first embodiment, the step-variable transmission portion 20 is a planetary gear type automatic transmission having the four AT gear positions for forward driving of the vehicle 10. However, the step-variable transmission portion 20 need not have the four AT gear positions, as long as the step-variable transmission portion 20 has a plurality of gear positions each of which is selectively established with engagement of a selected one or ones of a plurality of coupling devices. That is, the step-variable transmission portion 20 which is the planetary gear type automatic transmission in the first embodiment may be replaced by any other type of automatic transmission such as a known DCT (Dual Clutch Transmission) which is a synchronous meshing parallel two-axes type automatic transmission having two input shafts which are provided with respective coupling devices (clutches) and which are operatively connected to respective two shifting units having respective even-numbered gear positions and odd-numbered gear positions. In the DCT type automatic transmission, coupling devices each connecting to respective inputs of the two shifting units correspond to the selected ones of plurality of coupling devices of the present invention.

In the illustrated embodiments, the transmission device 40 as a whole is shifted to a selected one of the overall speed positions, like a step-variable transmission, according to the overall speed position shifting map. However, the transmission device 40 may be shifted to the selected overall speed position according to an operation of the shift lever 56, a shift-up/shift-down switch or any other member operated by the vehicle operator to shift the transmission device 40.

In the illustrated embodiments, the ten overall speed positions are established for the four AT gear positions. Although the number of the overall speed positions may be equal to the number of the AT gear positions, the number of the overall speed positions is preferably larger than the number of the AT gear positions, for instance, twice or more of the number of the AT gear positions. The numbers of the AT gear positions and the overall speed positions are suitably determined, as long as the step-variable transmission portion is shifted such that the rotating speed of the intermediate power transmitting member 30 and the operating speed of the second motor/generator MG2 connected to the intermediate power transmitting member 30 are held within respective predetermined ranges, and the transmission device 40 is shifted such that the engine speed ωe is held with a predetermined range.

In the illustrated embodiments, the differential mechanism 32 is the planetary gear set of the single-pinion type having the three rotary elements. However, the differential mechanism 32 may be replaced by a differential mechanism including a plurality of planetary gear sets which are connected to each other and which have four or more rotary elements. Alternatively, the differential mechanism 32 may be a planetary gear set of a double-pinion type, or a differential gear device including a pinion rotated by the engine 14 and a pair of bevel gears which mesh with the pinion and which are connected to the first motor/generator MG1 and the intermediate power transmitting member 30.

It is to be understood that the embodiments and modifications described above are given for illustrative purpose only, and that the present invention may be embodied with various other changes and improvements which may occur to those skilled in the art.

NOMENCLATURE OF ELEMENTS

10: Vehicle
14: Engine
20: Step-variable transmission portion (Step-variable transmission)
30: Intermediate power transmitting member (Input rotary member of step-variable transmission)
32: Differential mechanism
CA0: Carrier (First rotary element)
S0: Sun gear (Second rotary element)
R0: Ring gear (Third rotary element)
80: Electronic control device (Control apparatus)

82: Transmission shifting control portion (Shift control portion)
86: Torque control portion
88: Torque setting portion (Transmitted-torque setting portion)
92: Torque limiting portion
CB: Coupling devices
MG1: First motor/generator
MG2: Second motor/generator (Motor/generator)
100: Vehicle
110: Step-variable transmission
122: Control device
124: Input shaft (Input rotary member of step-variable transmission)
MG: Motor/generator

What is claimed is:

1. A control apparatus for a vehicle provided with a motor/generator functioning as a drive power source, and a step-variable transmission which constitutes a part of a power transmitting path between the drive power source and vehicle drive wheels and which is placed in a selected one of a plurality of speed positions with engagement of a selected one or ones of a plurality of coupling devices, said control apparatus comprising:

a torque control portion configured to control an output torque of the drive power source during a shifting action of the step-variable transmission from one of the plurality of speed positions to another of the plurality of speed positions, on the basis of a required vehicle drive torque corresponding to an operation amount of an accelerator pedal, such that a value representing a state of a rotary motion of an input rotary member of the step-variable transmission coincides with a target value; and a torque limiting portion configured to limit the required vehicle drive torque to a predetermined lower limit value in the process of a power-on shift-up action of the step-variable transmission which is performed by placement of the accelerator pedal in an operated position.

2. The control apparatus according to claim 1, further comprising a transmitted-torque setting portion configured to set a transmitted torque to be transmitted through one of the plurality of coupling devices which causes the shifting action to progress, on the basis of said required vehicle drive torque, and wherein said transmitted-torque setting portion sets said transmitted torque to be transmitted through said one of the plurality of coupling devices in the process of its power-on shift-up action, at a value set on the basis of the required vehicle drive torque at a moment of initiation of the power-on shift-up action, even if said required vehicle drive torque is lowered from said value in the process of the power-on shift-up action.

3. The control apparatus according to claim 1, wherein said torque limiting portion terminates the limitation of the required vehicle drive torque when a degree of progress of said power-on shift-up action has reached a predetermined value.

4. The control apparatus according to claim 2, wherein said torque limiting portion terminates the limitation of the required vehicle drive torque when a degree of progress of said power-on shift-up action has reached a predetermined value.

5. The control apparatus according to claim 1, wherein said torque limiting portion is configured to set said predetermined lower limit of said required vehicle drive torque on the basis of a kind of the power-on shift-up action of said step-variable transmission or a rotating speed of the input rotary member of said step-variable transmission.

6. The control apparatus according to claim 2, wherein said torque limiting portion is configured to set said predetermined lower limit of said required vehicle drive torque on the basis of a kind of the power-on shift-up action of said step-variable transmission or a rotating speed of the input rotary member of said step-variable transmission.

7. The control apparatus according to claim 3, wherein said torque limiting portion is configured to set said predetermined lower limit of said required vehicle drive torque on the basis of a kind of the power-on shift-up action of said step-variable transmission or a rotating speed of the input rotary member of said step-variable transmission.

8. The control apparatus according to claim 4, wherein said torque limiting portion is configured to set said predetermined lower limit of said required vehicle drive torque on the basis of a kind of the power-on shift-up action of said step-variable transmission or a rotating speed of the input rotary member of said step-variable transmission.

9. The control apparatus according to claim 1, wherein said vehicle is further provided with an engine also functioning as the drive power source, and a differential mechanism having a first rotary element to which said engine is operatively connected, a second rotary element to which a first motor/generator is operatively connected, and a third rotary element to which an intermediate power transmitting member is connected, and wherein said motor/generator is a second motor/generator operatively connected to said intermediate power transmitting member, said control apparatus further comprising a transmission shifting control portion configured to implement said shifting action of said step-variable transmission to said another of the plurality of speed positions, by controlling a releasing action of one of said plurality of coupling devices which has been placed in an engaged state before initiation of the shifting action, and an engaging action of another of said plurality of coupling devices which has been placed in a released state before initiation of the shifting action, said torque control portion controlling an output torque of said first motor/generator and an output torque of said second motor/generator during the shifting action of the step-variable transmission, on the basis of an output torque of said engine and a torque to be transmitted through one of said one and said another of the plurality of coupling devices which causes the shifting action to progress, such that an angular acceleration value of said second motor/generator and an angular acceleration value of said engine coincide with respective predetermined target values.

10. The control apparatus according to claim 2, wherein said vehicle is further provided with an engine also functioning as the drive power source, and a differential mechanism having a first rotary element to which said engine is operatively connected, a second rotary element to which a first motor/generator is operatively connected, and a third rotary element to which an intermediate power transmitting member is connected, and wherein said motor/generator is a second motor/generator operatively connected to said intermediate power transmitting member, said control apparatus further comprising a transmission shifting control portion configured to implement said shifting action of said step-variable transmission to said another of the plurality of speed positions, by controlling a releasing action of one of said plurality of coupling devices which has been placed in an engaged state before initiation of the shifting action, and an engaging action of another of said plurality of coupling devices which has been placed in a released state before initiation of the shifting action, said torque control portion controlling an output torque of said first motor/generator and an output torque of said second motor/generator during the shifting action of the step-variable transmission, on the basis of an output torque of said engine and a torque to be transmitted through one of said one and said another of the plurality of coupling devices which causes the shifting action to progress, such that an angular acceleration value of said second motor/generator and an angular acceleration value of said engine coincide with respective predetermined target values.

11. The control apparatus according to claim 3, wherein said vehicle is further provided with an engine also functioning as the drive power source, and a differential mechanism having a first rotary element to which said engine is operatively connected, a second rotary element to which a first motor/generator is operatively connected, and a third rotary element to which an intermediate power transmitting member is connected, and wherein said motor/generator is a second motor/generator operatively connected to said intermediate power transmitting member, said control apparatus further comprising a transmission shifting control portion configured to implement said shifting action of said step-variable transmission to said another of the plurality of speed positions, by controlling a releasing action of one of said plurality of coupling devices which has been placed in an engaged state before initiation of the shifting action, and an engaging action of another of said plurality of coupling devices which has been placed in a released state before initiation of the shifting action, said torque control portion controlling an output torque of said first motor/generator and an output torque of said second motor/generator during the shifting action of the step-variable transmission, on the basis of an output torque of said engine and a torque to be transmitted through one of said one and said another of the plurality of coupling devices which causes the shifting action to progress, such that an angular acceleration value of said second motor/generator and an angular acceleration value of said engine coincide with respective predetermined target values.

12. The control apparatus according to claim 4, wherein said vehicle is further provided with an engine also functioning as the drive power source, and a differential mechanism having a first rotary element to which said engine is operatively connected, a second rotary element to which a first motor/generator is operatively connected, and a third rotary element to which an intermediate power transmitting member is connected, and wherein said motor/generator is a second motor/generator operatively connected to said intermediate power transmitting member, said control apparatus further comprising a transmission shifting control portion configured to implement said shifting action of said step-variable transmission to said another of the plurality of speed positions, by controlling a releasing action of one of said plurality of coupling devices which has been placed in an engaged state before initiation of the shifting action, and an engaging action of another of said plurality of coupling devices which has been placed in a released state before initiation of the shifting action, said torque control portion controlling an output torque of said first motor/generator and an output torque of said second motor/generator during the shifting action of the step-variable transmission, on the basis of an output torque of said engine and a torque to be transmitted through one of said one and said another of the plurality of coupling devices which causes the shifting action to progress, such that an angular acceleration value of said second motor/generator and an angular acceleration value of said engine coincide with respective predetermined target values.

13. The control apparatus according to claim 5, wherein said vehicle is further provided with an engine also functioning as the drive power source, and a differential mechanism having a first rotary element to which said engine is operatively connected, a second rotary element to which a first motor/generator is operatively connected, and a third rotary element to which an intermediate power transmitting member is connected, and wherein said motor/generator is a second motor/generator operatively connected to said intermediate power transmitting member, said control apparatus further comprising a transmission shifting control portion configured to implement said shifting action of said step-variable transmission to said another of the plurality of speed positions, by controlling a releasing action of one of said plurality of coupling devices which has been placed in an engaged state before initiation of the shifting action, and an engaging action of another of said plurality of coupling devices which has been placed in a released state before initiation of the shifting action, said torque control portion controlling an output torque of said first motor/generator and an output torque of said second motor/generator during the shifting action of the step-variable transmission, on the basis of an output torque of said engine and a torque to be transmitted through one of said one and said another of the plurality of coupling devices which causes the shifting action to progress, such that an angular acceleration value of said second motor/generator and an angular acceleration value of said engine coincide with respective predetermined target values.

14. The control apparatus according to claim 6, wherein said vehicle is further provided with an engine also functioning as the drive power source, and a differential mechanism having a first rotary element to which said engine is operatively connected, a second rotary element to which a first motor/generator is operatively connected, and a third rotary element to which an intermediate power transmitting member is connected, and wherein said motor/generator is a second motor/generator operatively connected to said intermediate power transmitting member, said control apparatus further comprising a transmission shifting control portion configured to implement said shifting action of said step-variable transmission to said another of the plurality of speed positions, by controlling a releasing action of one of said plurality of coupling devices which has been placed in an engaged state before initiation of the shifting action, and an engaging action of another of said plurality of coupling devices which has been placed in a released state before initiation of the shifting action, said torque control portion controlling an output torque of said first motor/generator and an output torque of said second motor/generator during the shifting action of the step-variable transmission, on the basis of an output torque of said engine and a torque to be transmitted through one of said one and said another of the plurality of coupling devices which causes the shifting action to progress, such that an angular acceleration value of said second motor/generator and an angular acceleration value of said engine coincide with respective predetermined target values.

15. The control apparatus according to claim 7, wherein said vehicle is further provided with an engine also functioning as the drive power source, and a differential mechanism having a first rotary element to which said engine is operatively connected, a second rotary element to which a first motor/generator is operatively connected, and a third rotary element to which an intermediate power transmitting member is connected, and wherein said motor/generator is a second motor/generator operatively connected to said intermediate power transmitting member, said control apparatus further comprising a transmission shifting control portion configured to implement said shifting action of said step-variable transmission to said another of the plurality of speed positions, by controlling a releasing action of one of said plurality of coupling devices which has been placed in an engaged state before initiation of the shifting action, and an engaging action of another of said plurality of coupling devices which has been placed in a released state before initiation of the shifting action, said torque control portion controlling an output torque of said first motor/generator and an output torque of said second motor/generator during the shifting action of the step-variable transmission, on the basis of an output torque of said engine and a torque to be transmitted through one of said one and said another of the plurality of coupling devices which causes the shifting action to progress, such that an angular acceleration value of said second motor/generator and an angular acceleration value of said engine coincide with respective predetermined target values.

16. The control apparatus according to claim 8, wherein said vehicle is further provided with an engine also functioning as the drive power source, and a differential mechanism having a first rotary element to which said engine is operatively connected, a second rotary element to which a first motor/generator is operatively connected, and a third rotary element to which an intermediate power transmitting member is connected, and wherein said motor/generator is a second motor/generator operatively connected to said intermediate power transmitting member, said control apparatus further comprising a transmission shifting control portion configured to implement said shifting action of said step-variable transmission to said another of the plurality of speed positions, by controlling a releasing action of one of said plurality of coupling devices which has been placed in an engaged state before initiation of the shifting action, and an engaging action of another of said plurality of coupling devices which has been placed in a released state before initiation of the shifting action, said torque control portion controlling an output torque of said first motor/generator and an output torque of said second motor/generator during the shifting action of the step-variable transmission, on the basis of an output torque of said engine and a torque to be transmitted through one of said one and said another of the plurality of coupling devices which causes the shifting action to progress, such that an angular acceleration value of said second motor/generator and an angular acceleration value of said engine coincide with respective predetermined target values.

\* \* \* \* \*